US012620589B2

(12) United States Patent
Inoue et al.

(10) Patent No.: US 12,620,589 B2
(45) Date of Patent: May 5, 2026

(54) METHOD FOR PRODUCING POSITIVE ELECTRODE ACTIVE MATERIAL FOR LITHIUM SECONDARY BATTERY AND METHOD FOR PRODUCING POSITIVE ELECTRODE FOR LITHIUM SECONDARY BATTERY

(71) Applicant: SUMITOMO METAL MINING CO., LTD., Tokyo (JP)

(72) Inventors: Masashi Inoue, Niihama (JP); Yukako Aoyama, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 211 days.

(21) Appl. No.: 18/293,647

(22) PCT Filed: Jul. 27, 2022

(86) PCT No.: PCT/JP2022/028917
§ 371 (c)(1),
(2) Date: Jan. 30, 2024

(87) PCT Pub. No.: WO2023/013490
PCT Pub. Date: Feb. 9, 2023

(65) Prior Publication Data
US 2024/0347719 A1 Oct. 17, 2024

(30) Foreign Application Priority Data

Aug. 3, 2021 (JP) ................................. 2021-127585

(51) Int. Cl.
H01B 1/08 (2006.01)
C01G 53/42 (2025.01)
(Continued)

(52) U.S. Cl.
CPC ............ H01M 4/525 (2013.01); C01G 53/42 (2013.01); C01G 53/50 (2013.01); H01B 1/08 (2013.01);
(Continued)

(58) Field of Classification Search
CPC ............... H01B 1/00; H01B 1/06; H01B 1/08
See application file for complete search history.

(56) References Cited

U.S. PATENT DOCUMENTS 9,748,557 B2 * 8/2017 Holzapfel ......... H01M 10/0562
11,127,944 B2 * 9/2021 Yoon ..................... H01M 4/505
2022/0149365 A1 5/2022 Inoue et al.

FOREIGN PATENT DOCUMENTS

EP 3239103 A1 * 11/2017 ............. C01G 53/82
JP 2002-015739 A 1/2002
(Continued)

OTHER PUBLICATIONS

Shin et al "Li(Mn0.4Fe0.6)PO4 cathode active material: Synthesis and electrochemical performance evaluation", Journal of Physics and Chemistry of Solids 69 (2008) 1253-1256.*
(Continued)

*Primary Examiner* — Mark Kopec
(74) *Attorney, Agent, or Firm* — Foley & Lardner LLP

(57) ABSTRACT

A method for producing a positive electrode active material for a lithium secondary battery capable of reducing the amount of the lithium compound to be eluted and improving the cycle characteristic and the discharge rate characteristic of a lithium secondary battery is achieved. According to one embodiment of the present invention, a method for producing a positive electrode active material for a lithium secondary battery includes a step of mixing a powder P2 having a specific molar specific surface area and containing a
(Continued)

sulfate and/or a phosphate of a specific metal with a powder P1 containing a lithium metal composite oxide.

19 Claims, 1 Drawing Sheet

(51) Int. Cl.

| | | |
|---|---|---|
| *C01G 53/50* | (2025.01) |
| *H01M 4/1391* | (2010.01) |
| *H01M 4/525* | (2010.01) |
| *H01M 10/42* | (2006.01) |
| *H01M 4/02* | (2006.01) |

(52) U.S. Cl.
CPC ..... *H01M 4/1391* (2013.01); *H01M 10/4235* (2013.01); *C01P 2002/50* (2013.01); *C01P 2004/61* (2013.01); *C01P 2006/12* (2013.01); *C01P 2006/40* (2013.01); *H01M 2004/028* (2013.01)

(56) References Cited

FOREIGN PATENT DOCUMENTS

| | | |
|---|---|---|
| JP | 2009-146739 A | 7/2009 |
| JP | 2013-131437 A | 7/2013 |
| JP | 2015-046350 A | 3/2015 |
| JP | 2018-137147 A | 8/2018 |
| WO | WO-2013/021955 A1 | 2/2012 |
| WO | WO-2012/176904 A1 | 12/2012 |
| WO | WO-2017/110089 A1 | 6/2017 |

OTHER PUBLICATIONS

Kim et al "Lithium-Reactive Co3 ( PO4 ) 2 Nanoparticle Coating on High-Capacity LiNi0.8Co0.16AI0.04O2 Cathode Material for Lithium Rechargeable Batteries", Journal of the Electrochemical Society, 154 (6) A495-A499 (2007).*

English translation of form PCT/ISR/210 (mailed Oct. 18, 2022).*

International Searching Authority, "International Search Report," issued in connection with International Patent Application No. PCT/JP2022/028917, dated Oct. 18, 2022.

International Searching Authority, "Written Opinion," issued in connection with International Patent Application No. PCT/JP2022/028917, dated Oct. 18, 2022.

PCT International Preliminary Report on Patentability, dated Feb. 15, 2024, which includes a Translation of International Searching Authority, "Written Opinion," issued in connection with International Patent Application No. PCT/JP2022/028917, dated Oct. 18, 2022.

* cited by examiner

【Fig. 1】
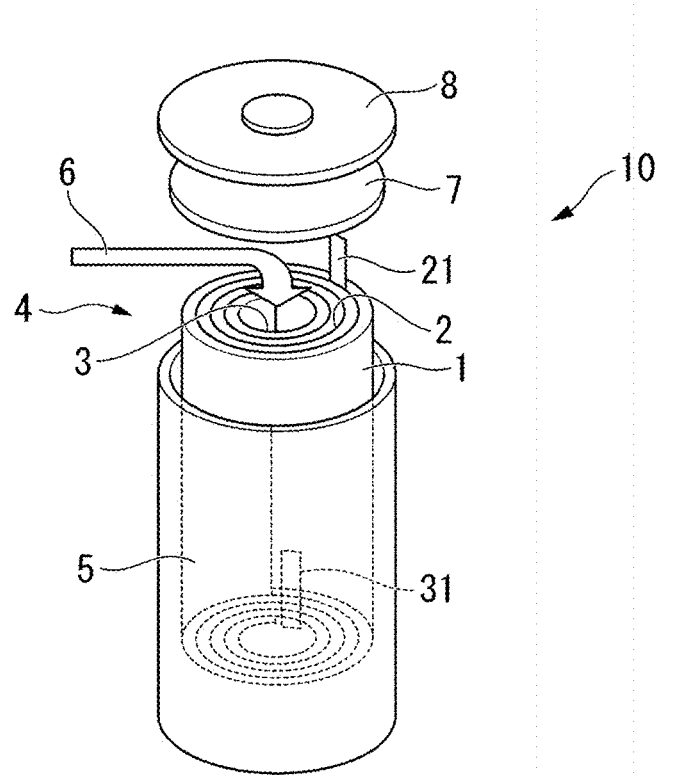
【Fig. 2】
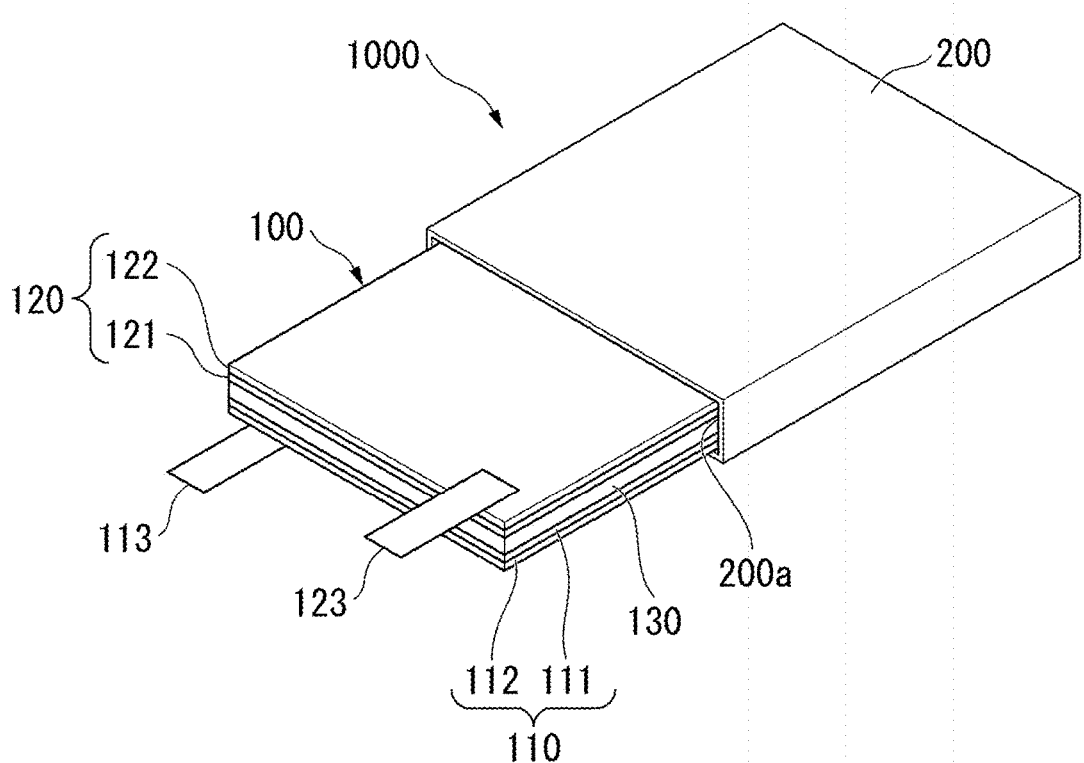

1

METHOD FOR PRODUCING POSITIVE ELECTRODE ACTIVE MATERIAL FOR LITHIUM SECONDARY BATTERY AND METHOD FOR PRODUCING POSITIVE ELECTRODE FOR LITHIUM SECONDARY BATTERY

CROSS-REFERENCE TO RELATED APPLICATIONS

The present application claims priority under 35 U.S.C. § 371 to International Patent Application No. PCT/JP2022/028917, filed Jul. 27, 2022, which claims priority to and the benefit of Japanese Patent Application No. 2021-127585, filed Aug. 3, 2021. The contents of these applications are hereby incorporated by reference in their entireties.

TECHNICAL FIELD

The present invention relates to a method for producing a positive electrode active material for a lithium secondary battery and a method for producing a positive electrode for a lithium secondary battery.

BACKGROUND ART

Lithium metal composite oxides are used as a matrix for positive electrode active materials for lithium secondary batteries. Known techniques related to lithium metal composite oxides or positive electrode active materials for lithium secondary batteries include, for example, the following techniques.

Patent Literature 1 discloses a positive electrode material for a lithium secondary battery consisting of a lithium transition metal composite oxide containing Group 1 and/or Group 2 element components (excluding lithium) of 100 to 1500 ppm and sulfate ion components of 150 to 10000 ppm.

Patent Literature 2 discloses a method for producing a positive electrode active material, including a step of adhering at least one of a sulfate and a boric acid compound to composite oxide particles containing lithium and at least one of nickel and cobalt, and a step of heating the composite oxide particles to which at least one of the sulfate and the boric acid compound is adhered in an oxidizing atmosphere.

Patent Literature 3 discloses a positive electrode composition for non-aqueous electrolyte secondary batteries, comprising a lithium transition metal composite oxide represented by a specific general formula and an acidic oxide.

CITATION LIST

Patent Literatures

[Patent Literature 1] JP2002-15739A
[Patent Literature 2] JP2009-146739A
[Patent Literature 3] JP2013-131437A

SUMMARY OF INVENTION

Technical Problems

However, there has been room for improvement in the aforementioned conventional art, for achieving a method for producing a positive electrode active material for a lithium secondary battery capable of reducing the amount of the alkaline lithium compound to be eluted and improving a cycle characteristic and a discharge rate characteristic of a lithium secondary battery.

It is an object of an aspect of the present invention to achieve a method for producing a positive electrode active material for a lithium secondary battery, capable of reducing the amount of the alkaline lithium compound to be eluted and improving the cycle characteristic and the discharge rate characteristic of the lithium secondary battery.

Solution to Problem

The present invention includes the following aspects.

<1> A method for producing a positive electrode active material for a lithium secondary battery, including a mixing step of mixing a powder P1 containing a lithium metal composite oxide and a powder P2 containing an additive compound to obtain a mixture, in which the lithium metal composite oxide has a layered structure and contains Ni, the additive compound is a salt of a cation of at least one element A selected from the group consisting of Al, Mg, Ca, Sr, Zr, Ti, Co, La, and Ce and any one anion selected from the group consisting of $$SO_4^{2-},$$

$$PO_4^{3-},$$

$$HPO_4^{2-},$$

and $$H_2PO_4^-,$$

and the powder P2 has a molar specific surface area S2, calculated by a formula (2) below, of 0.05 $m^2$/mmol or more.

$$S2 = BET2 \times F2/(1000 \times N2) \tag{2}$$

(In the formula (2), BET2 represents a BET specific surface area [$m^2$/g] of the powder P2, F2 represents a formula weight [g/mol] of a compositional formula of the additive compound, and N2 represents the number of element A in the compositional formula of the additive compound.)

<2> The method for producing the positive electrode active material for the lithium secondary battery according to <1>, in which a compositional formula of the lithium metal composite oxide is represented by a formula (I) below.

$$Li[Li_m(Ni_{(1-n)}X_n)_{1-m}]O_2 \tag{I}$$

(In the formula (I), X represents one or more elements selected from the group consisting of Co, Mn, Fe, Cu, Ti, Mg, Ca, Al, W, Mo, Nb, Zn, Sn, Zr, Ga, B, Si, S, and P, and $-0.1 \leq m \leq 0.2$ and $0 \leq n \leq 0.3$ are satisfied.)

<3> The method for producing the positive electrode active material for the lithium secondary battery according to <1> or <2>, including a step of obtaining the lithium metal composite oxide by mixing and calcining a lithium compound and a metal composite compound containing Ni before the mixing step.

<4> The method for producing the positive electrode active material for the lithium secondary battery according to any one of <1> to <3>, in which a ratio S2/S1 of a molar specific surface area S1 [m²/mmol] of the lithium metal composite oxide calculated by a formula (1) below to the molar specific surface area S2 [m²/mmol] of the powder P2 is 1.5 or more and 50 or less.

$$S1 = BET1 \times F1/1000 \qquad (1)$$

(In the formula (1), BET1 represents a BET specific surface area [m²/g] of the lithium metal composite oxide, and F1 represents a formula weight [g/mol] of the compositional formula of the lithium metal composite oxide.)

<5> The method for producing the positive electrode active material for the lithium secondary battery according to any one of <1> to <4>, including a classification step of classifying the mixture with a sieve after the mixing step.

<6> The method for producing the positive electrode active material for the lithium secondary battery according to any one of <1> to <5>, in which a ratio of an amount of element A contained in the additive compound to a total amount of metal elements other than Li contained in the lithium metal composite oxide in the mixture is 0.2 mol % or more and 3.0 mol % or less.

<7> The method for producing the positive electrode active material for the lithium secondary battery according to any one of <1> to <6>, in which a liquid mixture to be obtained by mixing the powder P2 and water at a ratio of the additive compound:water=0.1 mol:1 L in the powder P2 has a pH of less than 8.3 at 25° C.

<8> The method for producing the positive electrode active material for the lithium secondary battery according to <5>, in which D90 (P1)/OP, which is a ratio of a 90% cumulative volume particle diameter D90 (P1) [μm] of the lithium metal composite oxide to a mesh opening OP [μm] of the sieve, is 0.1 or more and 0.8 or less.

<9> The method for producing the positive electrode active material for the lithium secondary battery according to any one of <1> to <8>, in which the positive electrode active material for a lithium secondary battery has a 50% cumulative volume particle diameter D50 of 5 μm or more and 30 μm or less.

<10> The method for producing the positive electrode active material for the lithium secondary battery according to any one of <1> to <9>, in which the positive electrode active material for the lithium secondary battery has a BET specific surface area of 0.1 m²/g or more and 3 m²/g or less.

<11> A method for producing a positive electrode for a lithium secondary battery, including: a step of obtaining the positive electrode active material for the lithium secondary battery by the method for producing the positive electrode active material for the lithium secondary battery according to any one of <1> to <10>; and a step of supporting a positive electrode mixture containing the positive electrode active material for the lithium secondary battery on a positive electrode current collector.

Advantageous Effect of Invention

An aspect of the present invention can provide a method for producing a positive electrode active material for a lithium secondary battery capable of reducing the amount of the alkaline lithium compound to be eluted and improve a cycle characteristic and a discharge rate characteristic of a lithium secondary battery.

BRIEF DESCRIPTION OF DRAWINGS

FIG. 1 is a schematic view showing an example of a lithium secondary battery.

FIG. 2 is a schematic view showing an example of an all-solid-state lithium secondary battery.

DESCRIPTION OF EMBODIMENTS

An embodiment of the present invention will be described below, but the present invention is not limited to the present embodiment. In this description, "A to B" representing a numerical range means "A or more and B or less", unless otherwise specified.

In this description, Ni refers to the nickel element, not nickel metal, and Co, Al, Li and the like also refer to the cobalt element, aluminum element, lithium element, and the like, respectively.

In this description, a lithium metal composite oxide may be referred to as LiMO, and a positive electrode active material for a lithium secondary battery may be referred to as CAM as an abbreviation for a cathode active material for a lithium secondary battery. A positive electrode for a lithium secondary battery may be referred to simply as "positive electrode".

[1. Method for Producing Positive Electrode Active Material for Lithium Secondary Battery]

The method for producing a positive electrode active material for a lithium secondary battery (CAM) according to the present embodiment includes a mixing step of mixing a powder P1 containing a lithium metal composite oxide (LiMO) and a powder P2 containing an additive compound to obtain a mixture. The lithium metal composite oxide has a layered structure and contains Ni. The additive compound is a salt of a cation of at least one element A selected from the group consisting of Al, Mg, Ca, Sr, Zr, Ti, Co, La, and Ce and any one anion selected from the group consisting of $$SO_4^{2-},$$

$$PO_4^{3-},$$

$$HPO_4^{2-},$$

and $$H_2PO_4^{-}.$$

The molar specific surface area S2 of the powder P2, calculated by a formula (2) below, is 0.05 m²/mmol or more.

$$S2 = BET2 \times F2/(1000 \times N2) \qquad (2)$$

(In the formula (2), BET2 represents the BET specific surface area $[m^2/g]$ of the powder P2, F2 represents the formula weight [g/mol] of the compositional formula of the additive compound, and N2 represents the number of element A in the compositional formula of the additive compound.

As will be described below, in the production of CAM, lithium compound such as lithium hydroxide may be used as raw materials. In addition, lithium carbonate may be contained as an impurity in the raw material or as a by-product from lithium hydroxide. In a conventional CAM, such alkaline lithium compound may remain and elute.

For example, when lithium hydroxide or lithium carbonate comes into contact with an electrolytic solution, the electrolytic solution may decompose and generate gases. The gases generated may cause a deterioration of a cycle characteristic and a discharge rate characteristic.

In addition, a slurry obtained by mixing CAM with a binder or the like is applied to a current collector, so that a positive electrode can be obtained. Here, the reaction of lithium compound that has eluted and the binder may cause a gelation of the slurry, and when the gelation occurs, it becomes difficult to obtain a positive electrode in which CAM is uniformly applied, which may result in a deterioration of a cycle characteristic and a discharge rate characteristic.

Conventionally, in order to remove the remaining lithium compound, washing with water has been performed in some case. However, when the washing is performed, there may be problems of increase in production cost and deterioration of battery performance due to over-washing.

The production method according to the present embodiment described above comprises a step of mixing the powder P2 having a specific molar specific surface area S2 and containing a sulfate and/or a phosphate as the element A with the powder P1 containing LiMO. In particular, the powder P2 suitably comes into contact with the surface of the powder P1 by having a specific molar specific surface area S2. Thereby, the amount of the lithium compound to be eluted that functions as an alkali component present in CAM is reduced. Furthermore, the cycle characteristic and the discharge rate characteristic of the positive electrode and the battery having the positive electrode can be improved. Specific mechanisms of action presumed will be described below in a section <1-2. Powder P2> described below.

The inventors presumed that the specific surface area per weight of the powder P2 was important for allowing the powder P2 to come suitably into contact with the powder P1. However, the formula weight of the compositional formula of the additive compound contained in the powder P2 and the number of metal elements (element A) in the compositional formula greatly differ depending on the additive compound. The inventors have found that it is preferable to normalize the specific surface area per weight of the powder P2 based on the formula weight of the compositional formula and the number of metal elements.

<1-1. Powder P1>

The powder P1 contains LiMO. LiMO can be said to be a matrix of CAM. In the present embodiment, LiMO contains at least Li, Ni, and an oxygen atom. Preferably, the compositional formula of LiMO is represented by a formula (I) below.

$$Li[Li_m(Ni_{(1-n)}X_n)_{1-m}]O_2 \qquad (I)$$

(In the formula (I), X represents one or more elements selected from the group consisting of Co, Mn, Fe, Cu, Ti, Mg, Ca, Al, W, Mo, Nb, Zn, Sn, Zr, Ga, B, Si, S, and P, $-0.1 \leq m \leq 0.2$ and $0 \leq n \leq 0.3$ are satisfied.)

In the formula (I), m is preferably $-0.05$ or more, more preferably $-0.03$ or more, still more preferably 0 or more, in view of the initial capacity of the battery. In addition, m is preferably 0.05 or less, more preferably 0.03 or less, for reducing the amount of the lithium compound to be eluted. The upper limit value and lower limit value of m can be arbitrarily combined. For example, it is preferably $-0.05 \leq m \leq 0.05$, more preferably $-0.03 \leq m \leq 0.03$.

In the formula (I), n is preferably 0.01 or more, more preferably 0.03 or more, still more preferably 0.05 or more, in view of the cycle characteristic of the battery. In addition, n is preferably 0.30 or less, more preferably 0.25 or less, still more preferably 0.15 or less, in view of the capacity of the battery. The upper limit value and lower limit value of n can be arbitrarily combined. For example, it is preferably $0.01 \leq n \leq 0.30$, more preferably $0.03 \leq n \leq 0.25$, still more preferably $0.05 \leq n \leq 0.15$.

The element X is preferably one or more elements selected from the group consisting of Co, Mn, Ti, Mg, Ca, Al, W, Mo, Nb, Zr, B, Si, S, and P, more preferably one or more elements selected from the group consisting of Co, Mn, Ti, Mg, Al, W, Zr, S, and P, for improving the cycle characteristic of the lithium secondary battery.

LiMO is preferably represented by a formula (I') below.

$$Li[Li_m(Ni_{(1-n)}X_n)_{1-m}]O_2 \qquad (I')$$

(In the formula (I'), X represents one or more elements selected from the group consisting of Co, Mn, Ti, Mg, Ca, Al, W, Mo, Nb, Zr, B, Si, S, and P, and $-0.03 \leq m \leq 0.03$ and $0.03 \leq n \leq 0.25$ are satisfied.)

When the content of Ni in LiMO is high, that is, n in the formula (I) is 0.3 or less, the lithium compound remains and tends to be easily eluted. According to the production method according to the present embodiment, even when using LiMO with high content of Ni, the amount of the alkaline lithium compound to be eluted can be reduced.

The composition of LiMO can be analyzed using an ICP emission spectrometer after dissolving LiMO with an acid. The ICP emission spectrometer that can be used is, for example, SPS3000 manufactured by Seiko Instruments Inc.

In the present embodiment, the crystal structure of LiMO is a layered structure. The crystal structure is preferably a hexagonal crystal structure or a monoclinic crystal structure.

The hexagonal crystal structure is attributed to any one space group selected from the group consisting of P3, P31, P32, R3, P-3, R-3, P312, P321, P3112, P3121, P3212, P3221, R32, P3 m1, P31m, P3c1, P31c, R3m, R3c, P-31m, P-31c, P-3 m1, P-3c1, R-3m, R-3c, P6, P61, P65, P62, P64, P63, P-6, P6/m, P63/m, P622, P6122, P6522, P6222, P6422, P6322, P6 mm, P6cc, P63 cm, P63mc, P-6m2, P-6c2, P-62m, P-62c, P6/mmm, P6/mcc, P63/mcm, and P63/mmc.

Furthermore, the monoclinic crystal structure is attributed to any one space group selected from the group consisting of P2, P21, C2, Pm, Pc, Cm, Cc, P2/m, P21/m, C2/m, P2/c, P21/c, and C2/c.

Among these, the crystal structure of LiMO is particularly preferably a hexagonal crystal structure attributed to the space group R-3m or a monoclinic crystal structure attributed to the space group C2/m, for achieving a lithium secondary battery with high initial discharge capacity.

The crystal structure of LiMO can be measured using an X-ray diffractometer (for example, Ultima IV manufactured by Rigaku Corporation).

LiMO preferably has a molar specific surface area S1 calculated by a formula (1) below of 0.01 to 0.2 m²/mmol, more preferably 0.02 to 0.15 m²/mmol.

$$S1 = BET1 \times F1/1000 \tag{1}$$

(In the formula (1), BET1 represents a BET specific surface area [m²/g] of LiMO, and F1 represents a formula weight [g/mol] of the compositional formula of LiMO.)

The BET specific surface area of LiMO is preferably 0.1 to 2.0 m²/g, more preferably 0.2 to 1.6 m²/g. The BET specific surface area of LiMO can be measured using a BET specific surface area meter. As the BET specific surface area meter, Macsorb (registered trademark) manufactured by Mountech Co., Ltd., for example, can be used. When measuring the BET specific surface area of LiMO, drying at 150° C. for 30 minutes in the nitrogen atmosphere is preferably performed as a pretreatment.

The 90% cumulative volume particle diameter D90 (P1) of LiMO is preferably 8 to 40 μm, more preferably 10 to 30 μm. D90 (P1) means the value of the particle diameter at the point where the cumulative volume from the fine particle side is 90% when the whole is 100% in the volume-based cumulative particle size distribution curve obtained by measuring the particle size distribution of LiMO. D90 (P1) can be measured by the method described in Examples.

When the molar specific surface area S1 and/or D90 (P1) falls within the aforementioned a range, the powder P1 and the powder P2 can be brought into contact with each other more suitably.

<1-2. Powder P2>

The powder P2 contains an additive compound. In this description, the additive compound means a compound for adding the element A to LiMO, that is, an addition source of the element A. In the additive compound, a salt containing $SO_4{}^{2-}$ is also referred to as a sulfate, and a salt containing $$PO_4^{3-},$$

$$HPO_4^{2-},$$

or $$H_2PO_4-$$

is also referred to as a phosphate. Specific examples of the additive compound include $Al_2(SO_4)_3$, $AlPO_4$, $MgSO_4$, $MgHPO_4$, $Mg(H_2PO_4)_2$, $CaSO_4$, $CaHPO_4$, $Zr(SO_4)_2$, $Zr(HPO_4)_2$, $TiOSO_4$, $Ti(HPO_4)_2$, $CoSO_4$, $CO_3(PO_4)_2$, $La_2(SO_4)_3$, $Ce_2(SO_4)_3$, $Ce(SO_4)_2$, $SrSO_4$, and the like.

The additive compound may be contained in the powder P2 as hydrates. Examples of the hydrates include $Al_2(SO_4)_3 \cdot 15H_2O$, $MgSO_4 \cdot 7H_2O$, $MgSO_4 \cdot H_2O$, $MgHPO_4 \cdot 3H_2O$, $Mg(H_2PO_4)_2 \cdot 4H_2O$, $CaSO_4 \cdot 2H_2O$, $CaHPO_4 \cdot 2H_2O$, $Zr(SO_4)_2 \cdot 4H_2O$, $Zr(HPO_4)_2 \cdot 2H_2O$, $Ti(HPO_4)_2 \cdot 2H_2O$, $CoSO_4 \cdot 7H_2O$, $Co_3(PO_4)_2 \cdot 8H_2O$, $La_2(SO_4)_3 \cdot 9H_2O$, $Ce_2(SO_4)_3 \cdot 8H_2O$, $Ce(SO_4)_2 \cdot 4H_2O$, and the like. When the additive compound is a hydrate, F2 in the formula (2) represents a formula weight of a compositional formula as a hydrate.

The element A in the additive compound is preferably one or more elements selected from the group consisting of Al, Mg, Ca, Ti, Zr, Co, and La, more preferably one or more elements selected from the group consisting of Al, Mg, Ca, Ti and Zr, for reducing the amount of the lithium compound to be eluted in CAM.

When the molar specific surface area S2 of the powder P2 is 0.05 m²/mmol or more, the powder P2 can be moderately attached to or cover the surface of LiMO. Thereby, a compound containing sulfate radicals ($SO_4$ component) or phosphate radicals ($PO_4$ component) is disposed near the surface of LiMO. As a result, it is possible to suppress deterioration of the surface of LiMO due to discharge reactions, while accelerating desorption and insertion of lithium ions at the interface between LiMO and the electrolytic solution due to charge/discharge reactions of the battery. Therefore, the discharge rate characteristic and the cycle characteristic of the lithium secondary battery can be improved.

Furthermore, when the powder P2 has a cation of the element A, and the molar specific surface area S2 per metal element falls within the above range, neutralization between cation of the element A of the powder P2 and hydroxide ions ($OH^-$) and/or carbonate ions $$(CO_3^{2-})$$

in the lithium compound remaining in the powder P1 can be accelerated. Thereby, the reduction of the amount of the lithium compound to be eluted is accelerated. In addition, the hydroxide and/or carbonic acid compound of the element A considered to generate by the neutralization reaction is attached to or cover the surface of LiMO particles, so that deterioration of the surface of LiMO due to charge/discharge reactions can be suppressed.

Therefore, the cycle characteristic of the lithium secondary battery can be improved. The molar specific surface area S2 is more preferably 0.07 m²/mmol or more, still more preferably 0.09 m²/mmol or more.

The molar specific surface area S2 is preferably 1.5 m²/mmol or less, more preferably 1.2 m²/mmol or less, still more preferably 1.0 m²/mmol or less. When the molar specific surface area S2 is 1.5 m²/mmol or less, the powder P2 contains particles with moderately large particle diameter. Therefore, the bulk density of the mixture obtained by mixing LiMO and the powder P2 is moderately increased. Accordingly, when producing the positive electrode from CAM to be obtained, the filling properties are good, and the discharge rate characteristic of the lithium secondary battery can be improved. The molar specific surface area S2 may be 0.9 m²/mmol or less, 0.8 m²/mmol or less, or 0.7 m²/mmol or less.

The upper limit value and lower limit value of the molar specific surface area S2 can be arbitrarily combined. As examples of such combinations, 0.05 to 1.5 m²/mmol, 0.07 to 1.2 m²/mmol, 0.09 to 1.0 m²/mmol, and 0.05 to 0.7 m²/mmol are exemplary examples.

The BET specific surface area of the powder P2 is preferably 0.4 to 20 m²/g, more preferably 0.5 to 15 m²/g, still more preferably 1 to 10 m²/g. The BET specific surface area of the powder P2 can be measured using a BET specific surface area meter. As the BET specific surface area meter, Macsorb (registered trademark) manufactured by Mountech Co., Ltd., for example, can be used. As a pretreatment of the BET specific surface area, nitrogen gas is circulated in the powder P2 at room temperature for 30 minutes.

When the composition of the powder P2 is unknown, the composition can be determined by dissolving the powder P2 in an acid or water and subjecting it to elemental analysis by ICP emission spectrometry. In addition, the amount of hydrate can be analyzed by thermogravimetry or ignition loss method.

The powder P2 may contain only one additive compound or two or more additive compounds. Furthermore, the powder P2 may contain both of a sulfate and a phosphate. When the powder P2 contains two or more additive compounds, the molar specific surface area S2 is calculated in consideration of the weight ratio and molar ratio of such two or more additive compounds. For example, on the assumption that the powder P2 contains an additive compound α and an additive compound β at a weight ratio of $W_\alpha : W_\beta (W_\alpha + W_\beta = 1)$, a description is given as follows.

A molar ratio $M_\alpha$ of the amount of the element A contained in the additive compound α to the total amount of the element A contained in the additive compound α and the additive compound β is calculated from a formula (3) below.

$$M_\alpha = \{(W_\alpha/F_\alpha) \times N_\alpha\}/\{(W_\alpha/F_\alpha) \times N_\alpha + (W_\beta/F_\beta) \times N_\beta\} \qquad (3)$$

In the formula, $F_\alpha$ represents a formula weight of a compositional formula of the additive compound α, $N_\alpha$ represents the number of element A in the compositional formula of the additive compound α, $F_\beta$ represents a formula weight of a compositional formula of the additive compound β, $N_\beta$ represents the number of element A in the compositional formula of the additive compound β. Thereby, a molar ratio $M_\alpha : M_\beta (M_\alpha + M_\beta = 1)$ of the element A contained in the additive compound α and the element A contained in the additive compound β can be calculated.

Then, the BET specific surface area of the powder P2 can be calculated from the aforementioned weight ratio, the BET specific surface area $BET_\alpha$ of the additive compound α, and the BET specific surface area $BET_\beta$ of the additive compound β.

BET specific surface area of powder $P2 = BET_\alpha \times W_\alpha + BET_\beta \times W_\beta$ Next, the compositional formula of the powder P2 is determined as one compositional formula containing all elements contained in the additive compound α and the additive compound β. Here, the number of each element is converted based on the molar ratio of the element A contained in the additive compound α and the element A contained in the additive compound β. The total number of element A in the compositional formula converted is 1. Then, the formula weight of the compositional formula converted is determined. For example, the powder P2 containing magnesium sulfate anhydride ($MgSO_4$) and aluminum sulfate pentadecahydrate ($Al_2(SO_4)_3 \cdot 15H_2O$) will be described. The molar ratio of Mg and Al in the powder P2 is assumed to be 0.57:0.43. In this case, the compositional formula of the powder P2 would be $Mg_{0.57} Al_{0.43}(SO_4)_{1.21} \cdot 3.2H_2O$, and the formula weight would be 199 g/mol.

From these values, the molar specific surface area S2 of the powder P2 can be calculated. Details will be described later in Examples. When the powder P2 contains three or more additive compounds, calculation can be applied in the same manner.

In the powder P2, the pH of a liquid mixture obtained by mixing the powder P2 with water at a ratio of the additive compound:water=0.1 mol:1 L at 25° C. is preferably less than 8.3. When the pH falls within the aforementioned range, neutralization of lithium compound remaining in the powder P1 can be accelerated, thereby, the reduction of the amount of the lithium compound to be eluted is accelerated. The lower limit of the pH is not specifically limited but may be practically 1.0 or more. The pH is, for example, 1.0 or more and less than 8.3. When the additive compound is sparingly soluble in water, and the liquid mixture is not a solution but a dispersion, the pH of the supernatant is preferably measured.

<1-3. Mixing Step>

Lithium compound remaining on the surface of LiMO reacts with the additive compound contained in the powder P2 by the mixing step. Thereby, it is assumed that lithium compound is neutralized, to generate compounds derived from cations or anions contained in the additive compound on the surface of LiMO. As the compound generated by neutralization, a salt containing the element A, lithium sulfate, lithium phosphate, and the like are assumed, for example. Furthermore, even if neutralization does not proceed completely, it is assumed that the lithium component eluted during the step of producing the electrode can be captured by the additive compound.

From the mixture to be obtained by the mixing step, CAM can be obtained through a heat treatment step, a crushing step, and/or a classification step, as required.

It is preferable that the powder P1 and the powder P2 are uniformly mixed until there are no aggregates of the powder P1 and aggregates of the powder P2. Accordingly, the mixing device is preferably a mixing device that can uniformly mix the powder P1 and the powder P2, such as Loedige mixer.

The ratio S2/S1 of the molar specific surface area S2 [$m^2$/mmol] of the powder P2 to the molar specific surface area S1 [$m^2$/mmol] of LiMO is preferably 1.5 to 50, more preferably 3 to 30. When the S2/S1 is within the above range, the powder P1 and the powder P2 are moderately in contact with each other. Thereby, the reaction between the lithium compound remaining on the surface of LiMO and the additive compound can be accelerated, and the discharge rate characteristic and the cycle characteristic of the lithium secondary battery can be improved.

In the mixture, the ratio of the amount of the element A contained in the additive compound in the powder P2 to the total amount of metal elements other than Li contained in LiMO in the powder P1 is preferably 0.2 to 3.0 mol %, more preferably 0.5 to 2.5 mol %. When the ratios is within the above range, the surface of LiMO particles can be moderately covered by the compound containing the element A, and the discharge rate characteristic and the cycle characteristic of the lithium secondary battery can be improved.

In the mixing step, the powder P1 and the powder P2 may be mixed under heating. By heating, the temperature of the raw materials is preferably 45 to 250° C., more preferably 50 to 150° C. Thereby, the reaction between lithium compound remaining on the surface of LiMO and additive compound can be accelerated.

<1-4. Step of Obtaining Lithium Metal Composite Oxide>

The production method according to the present embodiment may include a step of obtaining LiMO by mixing and calcining lithium compound and metal composite compound containing Ni before the mixing step.

Examples of the lithium compound include lithium hydroxide, lithium carbonate, lithium nitrate, lithium acetate, lithium oxide, lithium chloride, lithium fluoride, and the like. One of these may be used alone, or two or more of them may be used. Lithium hydroxide, lithium acetate, and the like can react with carbon dioxide in the air to produce lithium carbonate. For example, when using lithium hydroxide and/or lithium acetate as a lithium compound, the lithium compound may contain 5 mass % or less of lithium carbonate.

In this description, the metal composite compound may be referred to also as MCC or precursor material. MCC can contain Ni and one or more elements selected from the group consisting of Co, Mn, Fe, Cu, Ti, Mg, Ca, Al, W, Mo, Nb, Zn, Sn, Zr, Ga, B, Si, S, and P. MCC is preferably a metal composite hydroxide or a metal composite oxide.

LiMO is obtained by mixing and calcining MCC with a lithium compound. For example, a lithium-nickel cobalt aluminum metal composite oxide is obtained by mixing and calcining a nickel cobalt aluminum metal composite hydroxide and the lithium compound. The mixing ratio of the lithium compound and MCC can be adjusted in consideration of the composition ratio of the final target compound. For calcining, dry air, oxygen atmosphere, inert atmosphere, or the like is used depending on the desired composition.

The lithium compound and MCC are mixed in consideration of the composition ratio of the final target compound, to obtain a mixture. Specifically, the amount (molar ratio) of Li contained in the lithium compound to the total amount 1 of metal elements contained in MCC is preferably 0.98 or more, more preferably 1.00 or more, still more preferably 1.02 or more.

The calcining temperature (highest holding temperature) is preferably 400° C. or more, more preferably 500° C. or more, still more preferably 600° C. or more, for accelerating the growth of LiMO particles. In addition, the calcining temperature is preferably 1000° C. or less, more preferably 950° C. or less, still more preferably 900° C. or less. In this description, the highest holding temperature in the calcining step means the highest temperature of holding temperatures of the atmosphere in the calcination furnace. The upper limit value and lower limit value of the calcining temperature can be arbitrarily combined. As examples of such combinations, 400 to 1000° C., 500 to 950° C., and 600 to 900° C. are exemplary examples.

The time for holding at the highest holding temperature is, for example, 0.1 to 20 hours, preferably 0.5 to 10 hours. As the calcination atmosphere, air, oxygen, nitrogen, argon, or a mixed gas thereof can be used.

The calcining step may be performed only once or may include multiple times of calcination. For example, the calcining step may include a primary calcining step and a secondary calcining step. For example, the highest holding temperature is different between the primary calcining step and the secondary calcining step. The highest holding temperature in the secondary calcining step may be higher than the highest holding temperature in the primary calcining step.

The highest holding temperature in the primary calcining step is preferably 400 to 750° C., more preferably 450 to 720° C., still more preferably 500 to 700° C. The upper limit of the highest holding temperature in the primary calcining step may be 680° C. or less. The time for holding at the highest holding temperature in the primary calcining step is preferably 0.5 to 20 hours, more preferably 1 to 6 hours.

The highest holding temperature in the secondary calcining step is preferably 650 to 900° C., more preferably 670 to 880° C., still more preferably 680 to 860° C., particularly preferably 700 to 840° C. The lower limit of the highest holding temperature in the secondary calcining step may be over 710° C. or may be over 720° C. The time for holding at the highest holding temperature in the secondary calcining step is preferably 1 to 30 hours, more preferably 2 to 12 hours.

<1-5. Step of Obtaining Metal Composite Compound>

The production method according to the present embodiment may include a step of obtaining MCC before the step of obtaining LiMO. MCC can be produced by coprecipitation methods such as the batch coprecipitation method or the continuous coprecipitation method. Hereinafter, the production method thereof will be described in detail by way of example of a metal composite hydroxide containing Ni, Co, and Al.

First, a nickel salt solution, a cobalt salt solution, an aluminum salt solution, and a complexing agent are reacted in a reaction vessel by a coprecipitation method, especially, the continuous method disclosed in JP2002-201028A, to produce a metal composite hydroxide represented by $Ni_{(1-b-c)}Co_bAl_c(OH)_2$ (in the formula, b+c<1.)

Examples of the nickel salt that is a solute of the nickel salt solution include nickel sulfate, nickel nitrate, nickel chloride, nickel acetate, and the like. Examples of the cobalt salt that is a solute of the cobalt salt solution include cobalt sulfate, cobalt nitrate, cobalt chloride, cobalt acetate, and the like. Examples of the aluminum salt that is a solute of the aluminum salt solution include aluminum sulfate sodium aluminate, and the like. The aforementioned metal salts are used at a ratio corresponding to the composition ratio of $Ni_{(1-b-c)}Co_bAl_c(OH)_2$. Furthermore, these metal salts may be used individually or in combination of two or more types. As the solvent, water can be used.

The complexing agent is a compound that can form a complex with Ni, Co, and Al ions in an aqueous solution. Examples of the complexing agent include ammonium ion donors (ammonium salts such as ammonium hydroxide, ammonium sulfate, ammonium chloride, ammonium carbonate, and ammonium fluoride), hydrazine, ethylenediaminetetraacetic acid, nitrilotriacetic acid, uracil diacetic acid, and glycine.

The complexing agent may or may not be used in the coprecipitation method. In the case of using the complexing agent, regarding the amount of the complexing agent contained in a mixed solution containing the nickel salt solution, the cobalt salt solution, the aluminum salt solution, and the complexing agent is, for example, the molar ratio to the total number of moles of metal salts is more than 0 and 2.0 or less.

In the coprecipitation method, the pH value of the mixed solution containing the nickel salt solution, the cobalt salt solution, the aluminum salt solution, and the complexing agent is adjusted, if necessary. For example, before the mixed solution changes from alkaline to neutral, an alkaline aqueous solution is added to the mixed solution. Examples of the alkaline aqueous solution include a sodium hydroxide aqueous solution, a potassium hydroxide aqueous solution, and the like.

The pH of the mixed solution is measured when the temperature of the mixed solution sampled from the reaction vessel reaches 40° C. When the temperature of the mixed solution sampled is lower or higher than 40° C., the mixed solution is appropriately heated or cooled to adjust it to 40° C., and then the pH is measured.

During the reaction, the temperature of the reaction vessel is controlled within the range of, for example, 20 to 80° C., preferably 30 to 70° C. In addition, the pH value in the reaction vessel is controlled within the range of, for example, pH 9 to 13, preferably pH 11 to 13.

The material in the reaction vessel is appropriately stirred and mixed. As the reaction vessel, an overflow type reaction vessel can be used to separate a reaction precipitate formed.

The inside of the reaction vessel may be an inert atmosphere. In an inert atmosphere, elements that are more easily oxidized than nickel can be prevented from aggregating, and a uniform metal composite hydroxide can be obtained.

In addition, while an inert atmosphere is maintained, the inside of the reaction vessel may be in an moderate oxygen-containing atmosphere, or in the presence of an oxidizing agent. An inert atmosphere can be maintained unless a large amount of oxygen gas is introduced into the reaction vessel. Furthermore, when controlling the atmosphere in the reaction vessel by a gas species, a predetermined gas species may be passed through the reaction vessel, or the reaction solution may be directly bubbled.

In addition to controlling the conditions described above, the oxidation state of the reaction product to be obtained may be controlled by supplying various gases (e.g., inert gases such as nitrogen, argon, and carbon dioxide; oxidizing gases such as air and oxygen; or mixed gases thereof) into the reaction vessel. In addition, peroxides such as hydrogen peroxide; peroxides salts such as permanganates; perchlorates; hypochlorites; nitric acid; halogens; ozone, and the like may be used as compounds that oxidize reaction products. Alternatively, organic acids such as oxalic acid and formic acid; sulfites; hydrazine, and the like may be used as compounds that reduce reaction products to be obtained.

After the above reactions, the reaction products obtained are washed with water and then dried to obtain a metal composite hydroxide. In addition, when impurities derived from the mixed solution remain in the reaction product only by washing with water, the reaction product may be washed with weak acid water, or an alkaline solution containing sodium hydroxide or potassium hydroxide, as required.

When using a sulfate (such as nickel sulfate) as the metal salt used as a raw material, it is preferable to remove the sulfate radicals in the reaction product by washing.

The amount of sulfate radicals contained in the metal composite hydroxide is preferably 0.9 wt % or less. MCC is easily efficiently reacted with the lithium compound by setting the amount of sulfate radicals within the above range, in the step of mixing with the lithium compound and calcining the mixture. The amount of sulfate radicals contained in the metal composite hydroxide is determined by measuring the amount of the sulfur element in the metal composite hydroxide using an ICP emission spectrometer and converting the value obtained into sulfate radicals ($SO_4$).

A metal composite oxide may be further prepared from the metal composite hydroxide obtained. For example, a nickel cobalt aluminum metal composite oxide can be prepared by heating a nickel cobalt aluminum metal composite hydroxide.

The heating time as the total time from the start of the temperature rise to the end of the temperature holding after the desired temperature is reached is completed is preferably set to 1 to 30 hours. The heating temperature can be, for example, 300 to 800° C.

Before mixing with the lithium compound, MCC may be dried. The drying conditions for MCC are not specifically limited, and may be, for example, any of conditions 1) to 3) below.

1) Conditions in which the metal composite oxide or metal composite hydroxide is not oxidized or reduced. Specifically, drying conditions in which the metal composite oxide is maintained as a metal composite oxide, or drying conditions in which the metal composite hydroxide is maintained as a metal composite hydroxide.

2) Drying conditions in which the metal composite hydroxide is oxidized to a metal composite oxide.

3) Drying conditions in which the metal composite oxide is reduced to a metal composite hydroxide.

In order to achieve the conditions 1), an inert gas such as nitrogen, helium, or argon can be used as the atmosphere during drying. In order to achieve the conditions 2), oxygen or air can be used as the atmosphere during drying. In order to achieve the conditions 3), a reductant such as hydrazine or sodium sulfite can be used in an inert gas atmosphere during drying. After drying MCC, classification may be performed as appropriate.

<1-6. Other Steps>

The method for producing CAM according to the present embodiment may include a crushing step of crushing the mixture after the mixing step. The yield of CAM after classification can be improved in the classification step described below by applying crushing. For the crushing step, a disk mill, a pin mill, and a jet mill can be used.

The method for producing CAM according to the present embodiment may include a classification step of classifying the mixture using a sieve after the mixing step. The classification step may be performed after the crushing step. D90 (P1)/OP that is a ratio of the 90% cumulative volume particle diameter D90 (P1) [μm] of LiMO to a mesh opening OP [μm] of the sieve is preferably 0.1 to 0.8, more preferably 0.2 to 0.7. When D90 (P1)/OP falls within the above ranges, since coarse particles formed by aggregates of the powder P1, aggregates of the powder P2, and aggregates of the powder P1 and the powder P2 remaining in the mixture can be efficiently removed, the discharge rate characteristic and the cycle characteristic of the lithium secondary battery are easily improved. OP is preferably 20 to 106 μm, more preferably 25 to 63 μm.

The method for producing CAM according to the present embodiment may or may not include a step of heat-treating the mixture after the mixing step. This step may be referred to also as a heat treatment step. The production method according to the present embodiment, for example, may comprise a step of heat-treating the mixture after the mixing step and before the classification step. Furthermore, the heat treatment step may be included after the mixing step and before the crushing step.

The highest holding temperature (heat treatment temperature) in the heat treatment step is preferably 250° C. or less, more preferably 200° C. or less. The lower limit of the heat treatment temperature is preferably 80° C. or more, more preferably 100° C. or more. The time for holding at the highest holding temperature in the heat treatment step is preferably 4 to 10 hours.

The heat treatment temperature of 250° C. or less is preferable in view of stability of the crystal structure, since it is possible to suppress the additive compound from diffusing into the inside of the crystal structure of LiMO. When the time for holding at the heat treatment temperature is 4 hours or more, the additive compound can be sufficiently diffused on the surface of LiMO.

[2. Positive Electrode Active Material for Lithium Secondary Battery]

CAM to be obtained by the production method according to the present embodiment will be described below. CAM can contain elements derived from LiMO and elements derived from the additive compound. CAM can be a powder. The composition of CAM can be analyzed using an ICP emission spectrometer after dissolving CAM powder with an acid. Microwave irradiation may be used to accelerate dissolution. The ICP emission spectrometer that can be used is, for example, SPS3000 manufactured by Seiko Instruments Inc.

CAM preferably satisfies a formula (II) below.

$$Li:Ni:Z:(S+P) = a:(1-b):b:c \qquad \text{(II)}$$

(In the formula (II), a, b, and c satisfy $0.90 \leq a \leq 1.2$, $0 < b \leq 0.3$, and $0.0010 \leq c \leq 0.05$, and Z represents one or more elements selected from the group consisting of Co, Mn, Fe, Cu, Ti, Mg, Al, W, Mo, Nb, Zn, Sn, Zr, Ga, B, Si, Ca, Sr, La and Ce.)

In CAM, the amount of the element A derived from the additive compound to the total amount of metal elements other than Li derived from LiMO is preferably 0.2 to 3.0 mol %, more preferably 0.3 to 2.5 mol %. The amount of the element A contained in CAM can be calculated from the results of the compositional analyses of LiMO and CAM.

The 50% cumulative volume particle diameter D50 of CAM is preferably 5 to 30 μm, more preferably 5.0 to 30.0 μm, still more preferably 7.0 to 28.0 μm, even still more preferably 10.0 to 25.0 μm. D50 of CAM means the value of the particle diameter at the point where the cumulative volume from the fine particle side is 50% when the whole is 100% in the volume-based cumulative particle size distribution curve obtained for CAM. D50 of CAM can be measured by the method described in Examples.

CAM preferably has a BET specific surface area of 0.1 to 3 m²/g, more preferably 0.10 to 3.0 m²/g, still more preferably 0.20 to 2.5 m²/g, even still more preferably 0.30 to 2.0 m²/g. When the BET specific surface area of CAM is 3 m²/g or less, the volume capacity density of the lithium secondary battery tends to be high. In addition, when the BET specific surface area of CAM is 0.1 m²/g or more, the discharge rate characteristic and the cycle characteristic of the lithium secondary battery are easily improved.

The BET specific surface area of CAM can be measured using a BET specific surface area meter. As the BET specific surface area meter, Macsorb (registered trademark) manufactured by Mountech Co., Ltd., for example, can be used. When the BET specific surface area of CAM is measured, drying at 150° C. for 30 minutes in the nitrogen atmosphere is preferably performed as a pretreatment.

[3. Lithium Secondary Battery]

Next, a suitable configuration of a lithium secondary battery in a case where CAM obtained by the production method of the present embodiment is used will be described. In addition, a suitable positive electrode for a lithium secondary battery in case where CAM obtained by the production method of the present embodiment will be described. Furthermore, a lithium secondary battery will be described as a suitable application of the positive electrode.

An example of the lithium secondary battery of the present embodiment has a positive electrode, a negative electrode, a separator interposed between the positive electrode and the negative electrode, and an electrolytic solution disposed between the positive electrode and the negative electrode. The positive electrode, the negative electrode, and the separator may be collectively referred to also as an electrode group.

FIG. 1 is a schematic view showing an example of a lithium secondary battery. A cylindrical lithium secondary battery 10 of the present embodiment can be produced, as follows.

First, as shown in FIG. 1, a pair of separators 1, a positive electrode 2, and a negative electrode 3 are laminated in the order of the separators 1, the positive electrode 2, the separators 1, and the negative electrode 3, and are wound up to form an electrode group 4. The separators 1, the positive electrode 2 and the negative electrode 3 are each strip-shaped. The positive electrode 2 has a positive electrode lead 21 at one end. The negative electrode 3 has a negative electrode lead 31 at one end.

Next, the electrode group 4 and an insulator which is not shown are accommodated in a battery can 5. Thereafter, the bottom of the battery can 5 is sealed. Then, the electrolyte is disposed between the positive electrode 2 and the negative electrode 3 by impregnating the electrode group 4 with an electrolytic solution 6. Furthermore, the upper part of the battery can 5 is sealed with a top insulator 7 and a sealing body 8, so that the lithium secondary battery 10 can be produced.

Examples of the shape of the electrode group 4 include a columnar shape. For example, the cross-sectional shape of the electrode group 4 when cut in a direction perpendicular to the winding axis may be a circle, an ellipse, a rectangle, or a rectangle with rounded corners.

In addition, as a shape of the lithium secondary battery having such an electrode group 4, a shape defined by IEC60086, which is a standard for batteries established by the International Electrotechnical Commission (IEC) or JIS C 8500 can be adopted. As such a shape, for example, shapes such as a cylindrical type and a square type can be exemplary examples.

Furthermore, the lithium secondary battery is not limited to the winding-type configuration and may have a laminated-type configuration in which the laminated structure of the positive electrode, the separator, the negative electrode, and the separator is repeatedly overlaid. As the laminated-type lithium secondary battery a so-called coin-type battery, button-type battery, or paper-type (or sheet-type) battery can be an exemplary example.

Hereinafter, each configuration will be sequentially described.

<3-1. Positive Electrode>

The positive electrode can be produced by first preparing a positive electrode mixture containing CAM, a conductive material, and a binder, and supporting the positive electrode mixture on a positive electrode current collector.

<3-2. Negative Electrode>

The negative electrode of the lithium secondary battery can be doped and dedoped with lithium ions at a lower potential than the positive electrode. As the negative electrode, an electrode in which a negative electrode mixture containing a negative electrode active material is supported on a negative electrode current collector and an electrode consisting of a negative electrode active material alone are exemplary examples.

For the positive electrode, the separator, the negative electrode, and the electrolytic solution that configure the lithium secondary battery, the configurations, materials, and the production method disclosed in [0113] to [0140] of WO2022/113904A1 can be used, for example.

[4. All-Solid-State Lithium Secondary Battery]

Next, a positive electrode using CAM to be obtained by the production method of the present embodiment as CAM of an all-solid-state lithium secondary battery, and the all-solid-state lithium secondary battery having the positive electrode will be described while describing the configuration of the all-solid-state lithium secondary battery.

FIG. 2 is a schematic view showing an example of the all-solid-state lithium secondary battery of the present embodiment. An all-solid-state lithium secondary battery 1000 shown in FIG. 2 has a laminate 100 and an exterior body 200 accommodating the laminate 100. The laminate 100 has a positive electrode 110, a negative electrode 120, and a solid electrolyte layer 130. In addition, the all-solid-state lithium secondary battery 1000 may have a bipolar structure in which CAM and a negative electrode active material are disposed on both sides of a current collector respectively. As specific examples of the bipolar structure, for example, the structure disclosed in JP2004-95400A are exemplary examples. The materials that configures each member will be described below.

The laminate 100 may have an external terminal 113 connected to a positive electrode current collector 112 and an external terminal 123 connected to a negative electrode current collector 122. Other than them, the all-solid-state lithium secondary battery 1000 may have a separator between the positive electrode 110 and the negative electrode 120.

The all-solid-state lithium secondary battery 1000 further has an insulator, not shown, that insulates between the laminate 100 and the exterior body 200 from each other, and a sealing, not shown, that seals an opening 200a of the exterior body 200.

As the exterior body 200, a container formed by molding a highly corrosion-resistant metal material such as aluminum, stainless steel, or nickel-plated steel can be used. In addition, as the exterior body 200, a container formed by processing a laminate film into a bag shape having at least one surface on which a corrosion resistant process has been performed into a bag shape can be used.

As the shape of the all-solid-state lithium secondary battery 1000, for example, shapes such as a coin type, a button type, a paper type (or sheet type), a cylindrical type, a rectangular type, or a laminate type (pouch type) can be exemplary examples.

Although the all-solid-state lithium secondary battery 1000 is illustrated as having one laminate 100 as an example, the present embodiment is not limited thereto. The all-solid-state lithium secondary battery 1000 may have a configuration in which the laminate 100 is used as a unit cell, and a plurality of unit cells (laminate 100) are sealed inside the exterior body 200.

<4-1. Positive Electrode>

The positive electrode 110 of the present embodiment has a positive electrode active material layer 111 and the positive electrode current collector 112. The positive electrode active material layer 111 contains CAM, which is one aspect of the present invention described above, and solid electrolyte. In addition, the positive electrode active material layer 111 may contain a conductive material and a binder.

<4-2. Negative Electrode>

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and the binder, those described above can be used.

For the all-solid-state lithium secondary battery, the configuration, the materials, and the production method disclosed in to of WO2022/113904A1 can be used, for example.

In the lithium secondary battery configured as above, since CAM produced by the above-described present embodiment is used, the cycle characteristic and the discharge rate characteristic of the lithium secondary battery using CAM can be improved. In addition, the positive electrode having the above-described configuration has CAM with the aforementioned configuration, and therefore the cycle characteristic and the discharge rate characteristic of the lithium secondary battery can be improved. Furthermore, the lithium secondary battery having the above-described configuration has the aforementioned positive electrode and thus becomes a secondary battery having excellent cycle characteristic and discharge rate characteristic.

One embodiment of the present invention includes a method for producing a positive electrode for a lithium secondary battery, the method including a step of obtaining CAM by the aforementioned method for producing CAM, and a step of supporting a positive electrode mixture containing CAM on a positive electrode current collector. In addition, one embodiment of the present invention includes a method for producing a lithium secondary battery, the method including a step of obtaining a positive electrode for a lithium secondary battery by the method for producing a positive electrode for a lithium secondary battery, and a step of disposing an electrolytic solution or solid electrolyte between the positive electrode for a lithium secondary battery and the negative electrode.

The present invention is not limited to the embodiments described above. Various modifications can be made within the scope of the claims, and the technical scope of the present invention also includes embodiments to be obtained by appropriately combining technical means disclosed respectively in different embodiments.

The present invention further includes the following aspects.

<21> A method for producing CAM, including a mixing step of mixing a powder P1 containing LiMO and a powder P2 containing an additive compound to obtain a mixture, in which LiMO has a layered structure and contains Ni, the additive compound is a salt of a cation of at least one element A selected from the group consisting of Al, Mg, Ca, Ti, and Zr and any one anion selected from the group consisting of $SO_4^{2-}$, $PO_4^{3-}$, $HPO_4^{2-}$, and $H_2PO_4^-$, and the powder P2 has a molar specific surface area S2 of 0.09 to 1.0 $m^2$/mmol.

<22> The method for producing CAM according to <21>, in which a compositional formula of LiMO is represented by the formula (I') above.

<23> The method for producing CAM according to <21> or <22>, including a step of obtaining LiMO by mixing and calcining a lithium compound and a metal composite compound containing Ni before the mixing step.

<24> The method for producing CAM according to any one of <21> to <23>, in which the ratio S2/S1 is 3 to 30.

<25> The method for producing CAM according to any one of <21> to <24>, including a classification step of classifying the mixture using a sieve after the mixing step.

<26> The method for producing CAM according to any one of <21> to <25>, in which a ratio of an amount of the element A contained in the additive compound to a total amount of metal elements other than Li contained in LiMO in the mixture is 0.5 to 2.5 mol %.

<27> The method for producing CAM according to any one of <21> to <26>, in which a liquid mixture to be obtained by mixing the powder P2 and water at a ratio of additive compound:water of 0.1 mol:1 L in the powder P2 has a pH of 1.0 or more and less than 8.3 at 25° C.

<28> The method for producing CAM according to <25>, in which D90 (P1)/OP is 0.2 to 0.7.

<29> The method for producing CAM according to any one of <21> to <28>, in which CAM has D50 of 10.0 to 25.0 µm.

<30> The method for producing CAM according to any one of <21> to <29>, in which CAM has a BET specific surface area of 0.30 to 2.0 m²/g.

<31> A method for producing a positive electrode for a lithium secondary battery, including: a step of obtaining the positive electrode active material for the lithium secondary battery by the method for producing CAM according to any one of <21> to <30>, and a step of supporting a positive electrode mixture containing the positive electrode active material for the lithium secondary battery on a positive electrode current collector to.

EXAMPLES

An example of the present invention will be described below.

[Evaluation Method]

<Powder P2>

(Molar Specific Surface Area S2)

BET2 [m²/g], which is the BET specific surface area of the powder P2, was measured using Macsorb (registered trademark) manufactured by Mountech Co., Ltd. As a pretreatment, a nitrogen gas was passed through the powder P2 at room temperature for 30 minutes. From BET2, the formula weight F2 [g/mol] of the compositional formula of the additive compound contained in the powder P2, and the number N2 of element A in the compositional formula of the additive compound, the molar specific surface area S2 [m²/mmol] was calculated based on a formula (2) below.

$$S2 = BET2 \times F2/(1000 \times N2). \qquad (2)$$

(pH of Liquid Mixture)

The powder P2 and pure water were mixed together at a ratio of the additive compound contained in the powder P2:pure water=0.1 mol:1 L. The pH of the liquid mixture at 25° C. was measured using a pH meter.

<Ratio S2/S1>

BET1 [m²/g], which is the BET specific surface area of LiMO, was measured using Macsorb (registered trademark) manufactured by Mountech Co., Ltd. As a pretreatment, LiMO was dried at 150° C. for 30 minutes in a nitrogen atmosphere. From BET1 and the formula weight F1 [g/mol] of the compositional formula of LiMO, the molar specific surface area S1 [m²/mmol] was calculated based on a formula (1) below.

$$S1 = BET1 \times F1/1000 \qquad (1)$$

The ratio S2/S1 was calculated from S1 thus calculated and the aforementioned S2.

<D90 (P1)/OP>

0.1 g of LiMO was put into 50 mL of a 0.2 mass % sodium hexametaphosphate aqueous solution, to obtain a dispersion in which LiMO was dispersed. Thereafter, the particle size distribution of the dispersion obtained was measured using Microtrac MT3300EXII manufactured by MicrotracBEL Corp. (laser diffraction scattering particle size distribution measuring device), to obtain a volume-based cumulative particle size distribution curve. Then, the value of the particle diameter at the point where the cumulative volume from the fine particle side was 90% when the whole was taken as 100% in the cumulative particle size distribution curve obtained was determined as the 90% cumulative volume particle diameter (D90 (P1)) [µm].

D90 (P1) was divided by the sieve mesh opening OP (45 µm), to obtain D90 (P1)/OP.

<Compositional Analysis>

After dissolving LiMO or CAM with an acid, the composition of LiMO or CAM was analyzed using an ICP emission spectrometer (SPS3000 manufactured by Seiko Instruments Inc.). In addition, the amount [mol %] of the element A derived from the additive compound to the total amount of metal elements other than Li derived from LiMO was circulated from the analysis results of LiMO and CAM obtained. The value obtained was regarded as "content of the element A". The amount of sulfate radicals contained in the metal composite hydroxide was determined by measuring the amount of the sulfur element in the metal composite hydroxide using the aforementioned ICP emission spectrometer and converting the value obtained into sulfate radicals ($SO_4$).

<X-Ray Diffraction Measurement>

LiMO powder was filled into a dedicated substrate, and it was measured with Cu-Kα rays under the conditions of a diffraction angle 2θ of 10° to 90°, a sampling width of 0.02°, and a scan speed of 4°/min, using an X-ray diffractometer (Ultima IV manufactured by Rigaku Corporation), to measure the diffraction peak. The crystal structure of LiMO was identified by analyzing the diffraction peak measured using an integrated powder analysis software JADE. When the peak with the highest intensity was observed within the range of 2θ=18.7±1°, and a peak with the second highest intensity was observed within the range of 2θ=44.6±1°, it was determined that LiMO had a layered structure and a crystal structure of space group R-3m.

<50% Cumulative Volume Particle Diameter D50>

0.1 g of CAM was put into 50 mL of a 0.2 mass % sodium hexametaphosphate aqueous solution, to obtain a dispersion in which CAM was dispersed. Thereafter, the particle size distribution of the dispersion obtained was measured using Microtrac MT3300EXII manufactured by MicrotracBEL Corp. (laser diffraction scattering particle size distribution measuring device) to obtain a volume-based cumulative particle size distribution curve. Then, the value of the particle diameter at the point where the cumulative volume from the fine particle side was 50% when the whole was taken as 100% in the cumulative particle size distribution curve obtained was determined as D50 [µm].

<BET Specific Surface Area>

The BET specific surface area [m²/g] of CAM was measured using Macsorb (registered trademark) manufactured by Mountech Co., Ltd. As a pretreatment, CAM was dried at 150° C. for 30 minutes in a nitrogen atmosphere.

<Cycle Retention Rate and Discharge Rate Capacity Ratio>

(Production of Positive Electrode)

CAM, a conductive material (acetylene black), and a binder (PVdF) were added and kneaded together at a ratio of composition of CAM:conductive material:binder=92:5:3 (mass ratio), to prepare a positive electrode mixture in paste form. When preparing the positive electrode mixture, N-methyl-2-pyrrolidone was used as an organic solvent.

The positive electrode mixture obtained was applied to an Al foil with a thickness of 40 µm, which was to serve as a current collector, and dried in vacuum at 150° C. for 8 hours, thereby obtaining a positive electrode. The electrode area of the positive electrode was set to 1.65 cm$^2$.

(Production of Lithium Secondary Battery (Coin-Type Half Cell))

The following operation was performed in a glovebox under an argon atmosphere. The positive electrode produced in the section (Production of positive electrode) was placed on the lower lid of a pair of a coin-type battery R2032 part (manufactured by Hohsen Corp.) with the Al foil surface facing downward, and a separator (polyethylene porous film) was placed thereon. 300 μL of an electrolytic solution was poured thereinto. As the electrolytic solution, a solution obtained by dissolving LiPF$_6$ so as to be 1.0 mol/L in a liquid mixture of ethylene carbonate, dimethyl carbonate, and ethyl methyl carbonate in 30:35:35 (volume ratio) was used.

As a negative electrode, metal lithium was used. The negative electrode was placed on the upper side of the separator, an upper lid was placed through a gasket further thereon, and they were caulked with a caulking machine, to produce a lithium secondary battery (coin-type half cell R2032). The lithium secondary battery may be hereinafter referred to as "half cell".

(Charge/Discharge Test)

Using the half cell produced by the method, the discharge rate test and the cycle test were conducted.

Initial Charge/Discharge

Constant current and constant voltage charging and constant current discharging were performed at a test temperature of 25° C. The current setting value was 0.2 CA for both charging and discharging. The maximum charge voltage was 4.3 V, and the minimum discharge voltage was 2.5 V.

Discharge Rate Test

The discharge rate test was performed after the aforementioned initial charge/discharge, and the test temperature was set to 25° C. Constant current constant voltage charging was performed at a current setting value of 1 CA and a maximum voltage of 4.3 V, and discharging was performed at a current setting value of 0.2 CA and a minimum voltage of 2.5 V. In addition, constant current constant voltage charging was performed at a current setting value of 1.0 CA and a maximum voltage of 4.3 V, and discharging was performed at a current setting value of 5 CA and a minimum voltage of 2.5 V. From the values of the discharge capacity at 0.2 CA and the discharge capacity at 5 CA obtained by measurement, the discharge rate capacity ratio was calculated by a formula (a) below.

$$\text{Discharge rate capacity ratio [\%]} = \hspace{2em} \text{formula (a)}$$
$$\frac{\text{discharge capacity [mAh/g] at 5 } CA/}{\text{discharge capacity [mAh/g] at 0.2 } CA} \times 100$$

The higher the discharge rate capacity ratio, the higher the discharge capacity can be obtained even when the battery is operated at a larger discharging current. Therefore, it indicates the discharge rate characteristic are better.

Cycle Test

The cycle test was conducted after the discharge rate test, and the test temperature was set to 25° C. The number of repetitions of the charge/discharge cycle was 50 times. In each cycle, the following constant current and constant voltage charging and constant current discharging were performed.

Charging: Constant voltage and constant current charging with a current setting value of 0.5 CA and a maximum voltage of 4.3 V Discharging: Constant current discharging with a current setting value of 1 CA and a minimum voltage of 2.5 V Cycle Retention Rate The cycle retention rate was calculated from the discharge capacity at the first cycle and the discharge capacity at the 50th cycle in the cycle test by a formula (b) below.

$$\text{Cycle retention rate [\%]} = \text{discharge capacity [mAh/g] at 50} \hspace{1em} \text{formula (b)}$$
$$\text{th cycle/discharge capacity at first cycle [mAh/g]} \times 100$$

The higher the cycle retention rate, the better the cycle characteristic.

<Amount of Lithium Eluted>

5 g of CAM and 100 g of pure water were put into a 100 mL polypropylene container, to form a slurry. A stirring bar was put into the slurry, and the container was sealed, followed by stirring for 5 minutes. After stirring, the slurry was filtered, and 0.1 mol/L hydrochloric acid was continuously added dropwise to 60 g of the filtrate obtained by filtration, using an automatic titrator (AT-610 manufactured by Kyoto Electronics Manufacturing Co., Ltd.) until a pH became 4.0. The titration of hydrochloric acid at pH=8.3±0.1 was referred to as A [mL], and the titration of hydrochloric acid at pH=4.5±0.1 was referred to as B [mL]. Then, the lithium carbonate concentration and the lithium hydroxide concentration eluted from CAM were calculated respectively from formulas (c) and (d) below. In formulas (c) and (d) below, the molecular weights of lithium carbonate and lithium hydroxide were calculated, assuming that the respective atomic weights were H: 1.000, Li: 6.941, C: 12, and O: 16.

$$\text{Lithium carbonate concentration [wt \%]} = \hspace{2em} \text{formula (c)}$$
$$\{0.1 \times (B - A)/1000\} \times \{73.882/(20 \times 60/100)\} \times 100$$

$$\text{Lithium hydroxide concentration [wt \%]} = \hspace{2em} \text{formula (d)}$$
$$\{0.1 \times (2A - B)/1000\} \times \{23.941/(20 \times 60/100)\} \times 100$$

The amount of lithium eluted was calculated from the lithium carbonate concentration and the lithium hydroxide concentration calculated by a formula (e) below.

$$\text{Amount of lithium eluted [wt \%]} = \hspace{2em} \text{formula (e)}$$
$$\text{lithium carbonate concentration} \times (2 \times 6.941/73.882) +$$
$$\text{lithium hydroxide concentration} \times (6.941/23.941)$$

Example 1

(Preparation of Precursor Material)

After water was poured into a reaction vessel equipped with a stirrer and an overflow pipe, a sodium hydroxide aqueous solution was added, and the liquid temperature was held at 50° C.

A nickel sulfate aqueous solution and a cobalt sulfate aqueous solution were mixed so that a molar ratio of Ni and Co is 0.88:0.09, to prepare a mixed raw material solution.

Furthermore, an aluminum sulfate aqueous solution was prepared as a raw material solution containing Al.

Then, the mixed raw material solution and the aluminum sulfate aqueous solution were continuously added into the reaction vessel under stirring so that a molar ratio of Ni, Co, and Al is 0.88:0.09:0.03, and an ammonium sulfate aqueous solution was continuously added as a complexing agent. A sodium hydroxide aqueous solution was timely added dropwise so that the pH of the solution in the reaction vessel was 11.7 (measurement temperature: 40° C.), to obtain a reaction precipitate.

The reaction precipitate was washed, then dehydrated, dried, and classified, to obtain a metal composite hydroxide 1 containing Ni, Co, and Al.

The metal composite hydroxide 1 was held and heated at 650° C. for 5 hours in the atmosphere, and then cooled to room temperature, to obtain a metal composite oxide 1. The metal composite hydroxide 1 contained sulfate radical of 0.4 wt %.

(Preparation of Powder P1)

The metal composite oxide 1 and lithium hydroxide monohydrate were mixed so that the molar ratio Li/(Ni+Co+Al) of the amount of Li to the total amount 1 of Ni, Co, and Al contained in the metal composite oxide 1 is 1.00, to obtain a mixture 1.

Then, the mixture 1 obtained was filled into a sagger, and it was calcined in a calcination furnace at a highest holding temperature of 650° C. in an atmosphere of pure oxygen for 5 hours, to obtain a calcined product 1. The calcined product 1 was crushed using a stone mill-type crusher. Furthermore, the powder after crushing was filled into the sagger, and it was calcined in a calcination furnace at a highest holding temperature of 780° C. for 5 hours in an atmosphere of pure oxygen, to obtain a calcined product 2. The calcined product 2 was crushed using a stone mill-type crusher, to obtain a powder P1-1 of LiMO-1. D90 (D90 (P1)) of LiMO-1 was 23 μm.

(Mixing Step and Classification Step)

The powder P1-1 of LiMO-1 and the powder P2-1 of magnesium sulfate anhydride ($MgSO_4$) were mixed for 5 minutes in a mortar so that the amount of Mg in the powder P2-1 and the amount of Ni, Co, and Al in the powder P1-1 satisfied Mg/(Ni+Co+Al)=2.0 mol %, to obtain a mixture 3-1.

The BET specific surface area of LiMO-1 was 0.30 $m^2$/g, the formula weight of LiMO-1 was 96.6 g/mol, and the molar specific surface area S1 of LiMO-1 was 0.029 $m^2$/mmol. The BET specific surface area of the powder P2-1 was 5.5 $m^2$/g, the formula weight as magnesium sulfate anhydride was 120 g/mol, the number of element A was 1, and the molar specific surface area S2 of the powder P2-1 was 0.66 $m^2$/mmol. The pH of the liquid mixture of the powder P2-1 was 6.5. LiMO-1 had a layered structure and satisfied m=−0.002, n=0.12, and X=Co, Al, and S in the formula (I).

The mixture 3-1 contained coarse white particles determined as aggregates of particles of magnesium sulfate by visual inspection. The mixture 3-1 was classified by passing it through a sieve (300 mesh) with a mesh opening of 45 μm, to obtain a powder that passed through the sieve as CAM-1. D90 (P1)/OP was 0.5. The molar ratio of each element contained in CAM-1 satisfied Li:Ni:(Co+Al+Mg):S=0.98:0.86:0.14:0.023 as a result of ICP elemental analysis, and the content of the element A was 1.8 mol %. D50 of CAM-1 was 13.7 μm, and the BET specific surface area was 0.46 $m^2$/g.

Example 2

A powder P2-2 of zirconium sulfate anhydride ($Zr(SO_4)_2$) was used instead of the powder P2-1. CAM-2 was obtained in the same manner as in Example 1 except that the powder P1-1 and the powder P2-2 were mixed so that the amount of Zr in the powder P2-2 and the amount of Ni, Co, and Al in the powder P1-1 satisfied Zr/(Ni+Co+Al)=0.8 mol %.

The BET specific surface area of the powder P2-2 was 2.2 $m^2$/g, the formula weight of zirconium sulfate anhydride was 283 g/mol, the number of element A was 1, and the molar specific surface area S2 of the powder P2-2 was 0.62 $m^2$/mmol.

The molar ratio of each element contained in CAM-2 satisfied Li:Ni:(Co+Al+Zr):S=0.99:0.87:0.13:0.018 as a result of ICP elemental analysis, and the content of the element A is 0.7 mol %. D50 of CAM-2 was 13.5 μm, and the BET specific surface area was 0.29 $m^2$/g.

Example 3

A powder P2-3 of aluminum sulfate pentadecahydrate ($Al_2(SO_4)_3 \cdot 15H_2O$) was used instead of the powder P2-1. The powder P1-1 and the powder P2-3 were mixed so that the amount of Al in the powder P2-3 and the amount of Ni, Co, and Al in the powder P1-1 satisfied Al (derived from P2-3)/(Ni+Co+Al (derived from P1-1))=0.8 mol %. During the mixing, the powder P1-1 and the powder P2-3 were heated to a temperature of 50° C. CAM-3 was obtained in the same manner as in Example 1 except for these.

The BET specific surface area of the powder P2-3 was 0.82 $m^2$/g, the formula weight of aluminum sulfate pentadecahydrate was 612 g/mol, the number of element A was 2, and the molar specific surface area S2 of the powder P2-3 was 0.25 $m^2$/mmol.

The molar ratio of each element contained in CAM-3 satisfied Li:Ni:(Co+Al):S=0.99:0.88:0.12:0.012 as a result of ICP elemental analysis, and the content of the element A was 0.5 mol %. D50 of CAM-3 was 14.0 μm, and the BET specific surface area was 0.33 $m^2$/g.

Example 4

CAM-4 was obtained in the same manner as in Example 3 except that the powder P1-1 and the powder P2-3 were mixed without heating, the mixture 3-2 obtained was heated at a highest holding temperature of 150° C. for 8 hours under vacuum atmosphere.

The molar ratio of each element contained in CAM-4 satisfied Li:Ni:(Co+Al):S=0.99:0.87:0.13:0.015 as a result of ICP elemental analysis, and the content of the element A was 0.7 mol %. D50 of CAM-4 was 14.2 μm, and the BET specific surface area was 0.30 $m^2$/g.

Example 5

The powder P2-4 of magnesium hydrogen phosphate trihydrate ($MgHPO_4 \cdot 3H_2O$) was used instead of the powder P2-1. The powder P1-1 and the powder P2-4 were mixed so that the amount of Mg in the powder P2-4 and the amount of Ni, Co, and Al in the powder P1-1 satisfied Mg/(Ni+Co+Al)=1.7 mol %. CAM-5 was obtained in the same manner as in Example 1 except for these.

The BET specific surface area of the powder P2-4 was 0.53 $m^2$/g, the formula weight of magnesium hydrogen phosphate trihydrate was 174.3 g/mol, the number of element A was 1, and the molar specific surface area S2 of the powder P2-4 was 0.092 $m^2$/mmol.

The molar ratio of each element contained in CAM-5 satisfied Li:Ni:(Co+Al+Mg):(S+P)=0.98:0.86:0.14:0.021 as a result of ICP elemental analysis, and the content of the element A was 1.6 mol %. D50 of CAM-5 was 14.3 μm, and the BET specific surface area was 0.37 m²/g.

Example 6

A powder P2-5 containing the powder P2-1 and the powder P2-3 at a weight ratio of 0.35:0.65 was used instead of the powder P2-1. It can also be said that the powder P2-5 contains Mg and Al at a molar ratio of 0.57:0.43. The powder P1-1 and the powder P2-5 were mixed so that the amount of Mg and Al in the powder P2-5 and the amount of Ni, Co, and Al in the powder P1-1 satisfied (Mg+Al (derived from P2-3))/(Ni+Co+Al (derived from P1-1))=2.1 mol %. CAM-6 was obtained in the same manner as in Example 1 except for these.

The BET specific surface area of the powder P2-5, as calculated from the weight ratio of the powder P2-1 and the powder P2-3, was $0.35 \times 5.54 + 0.65 \times 0.82 = 2.4$ m²/g. The compositional formula of the powder P2-5 calculated in terms of the molar ratio of Mg and Al was $Mg_{0.57}Al_{0.43}$ $(SO_4)_{1.21} \cdot 3.2H_2O$, the formula weight was 199 g/mol, and the number of element A was 1. Accordingly, the molar specific surface area S2 of the powder P2-5 was 0.48 m²/mmol.

The molar ratio of each element contained in CAM-6 satisfied Li:Ni:(Co+Al+Mg):S=0.98:0.86:0.14:0.030 as a result of ICP elemental analysis, and the content of the element A was 1.9 mol %. D50 of CAM-6 was 13.7 μm, and the BET specific surface area was 0.38 m²/g.

Example 7

The powder P2-6 of calcium sulfate dihydrate ($CaSO_4 \cdot 2H_2O$) was used instead of the powder P2-1. CAM-7 was obtained in the same manner as in Example 1 except that the powder P1-1 and the powder P2-6 were mixed so that the amount of Ca in the powder P2-6 and the amount of Ni, Co, and Al in the powder P1-1 satisfied Ca/(Ni+Co+Al)=2.0 mol %.

The BET specific surface area of the powder P2-6 was 1.1 m²/g, the formula weight of calcium sulfate dihydrate was 172.2 g/mol, the number of element A was 1, and the molar specific surface area S2 of the powder P2-6 was 0.19 m²/mmol.

The molar ratio of each element contained in CAM-7 satisfied Li:Ni:(Co+Al+Ca):S=0.98:0.86:0.14:0.024 as a result of ICP elemental analysis, and the content of the element A was 1.9 mol %. D50 of CAM-7 was 13.7 μm, and the BET specific surface area was 0.48 m²/g.

Example 8

The powder P2-7 containing the powder P2-1 and a powder P2-6 at a weight ratio of 0.59:0.41 was used instead of the powder P2-1. It can also be said that the powder P2-7 contains Mg and Ca at a molar ratio of 0.67:0.33. The powder P1-1 and the powder P2-7 were mixed so that the amount of Mg and Ca in the powder P2-7 and the amount of Ni, Co, and Al in the powder P1-1 satisfied (Mg+Ca)/(Ni+Co+Al)=1.8 mol %. CAM-8 was obtained in the same manner as in Example 1 except for these.

The BET specific surface area of the powder P2-7, as calculated from the weight ratio of the powder P2-1 and the powder P2-6, was $0.59 \times 5.5 + 0.41 \times 1.1 = 3.7$ m²/g. The compositional formula of the powder P2-7 calculated in terms of the molar ratio of Mg and Ca was $Mg_{0.67}$ $Ca_{0.33}(SO_4)_{1.0} \cdot 0.67H_2O$, the formula weight was 137.7 g/mol, and the number of element A was 1. Accordingly, the molar specific surface area S2 of the powder P2-7 was 0.51 m²/mmol.

The molar ratio of each elements contained in CAM-8 satisfied Li:Ni:(Co+Al+Mg+Ca):S=0.98:0.86:0.14:0.022 as a result of ICP elemental analysis, and the content of the element A was 1.7 mol %. D50 of CAM-8 was 13.7 μm, and the BET specific surface area was 0.48 m²/g.

Example 9

The powder P2-8 of lanthanum sulfate anhydride ($La_2$ $(SO_4)_3$) that passed through a sieve with a mesh opening of 45 μm was used instead of the powder P2-1. CAM-9 was obtained in the same manner as in Example 1 except that the powder P1-2 obtained by passing the powder P1-1 through the sieve with a mesh opening of 45 μm and the powder P2-8 were mixed so that the amount of La in the powder P2-8 and the amount of Ni, Co, and Al in the powder P1-2 satisfied La/(Ni+Co+Al)=0.8 mol %, and the powder after mixing was referred to as CAM-9 without passing through the sieve.

The BET specific surface area of the powder P2-8 was 2.9 m²/g, the formula weight of lanthanum sulfate anhydride was 566.0 g/mol, the number of element A was 2, and the molar specific surface area S2 of the powder P2-8 was 0.83 m²/mmol.

The molar ratio of each element contained in CAM-9 satisfied Li:Ni:(Co+Al+La):S=0.99:0.87:0.13:0.015 as a result of ICP elemental analysis, and the content of the element A was 0.8 mol %. D50 of CAM-9 was 13.6 μm, and the BET specific surface area was 0.28 m²/g.

Comparative Example 1

CAM-10 was obtained in the same manner as in Example 1 except that the powder P2-1 was not added. That is, the powder P1-1 was classified by passing it through a sieve (300 mesh) with a mesh opening of 45 μm, to obtain the powder that passed through the sieve as CAM-10. The molar ratio of each element contained in CAM-10 satisfied Li:Ni: (Co+Al):S=1.00:0.88:0.12:0.004 as a result of ICP elemental analysis. D50 of CAM-10 was 14.0 μm, and the BET specific surface area was 0.31 m²/g.

Comparative Example 2

The powder P2-9 of magnesium sulfate heptahydrate (($MgSO_4) \cdot 7H_2O$) was used instead of the powder P2-1. The powder P1-1 and the powder P2-9 were mixed so that the amount of Mg in the powder P2-9 and the amount of Ni, Co, and Al in the powder P1-1 satisfied Mg/(Ni+Co+Al)=2.4 mol %. CAM-11 was obtained in the same manner as in Example 1 except that the powder after mixing was referred to as CAM 11 without passing through the sieve.

The BET specific surface area of the powder P2-9 was 0.14 m²/g, the formula weight of magnesium sulfate heptahydrate was 246.5 g/mol, the number of element A was 1, and the molar specific surface area S2 of the powder P2-9 was 0.035 m²/mmol.

The molar ratio of each element contained in CAM-11 satisfied Li:Ni:(Co+Al+Mg):S=0.99:0.85:0.15:0.029 as a result of ICP elemental analysis, and the content of the element A was 2.4 mol %. D50 of CAM-11 was 13.9 μm, and the BET specific surface area was 0.31 m²/g.

Comparative Example 3

CAM-12 was obtained in the same manner as in Example 1 except that the powder P1-1 and the powder P2-9 were mixed so that the amount of Mg in the powder P2-9 and the amount of Ni, Co, and Al in the powder P1-1 satisfied Mg/(Ni+Co+Al)=1.6 mol %.

The molar ratio of each element contained in CAM-12 satisfied Li:Ni:(Co+Al+Mg):S=0.99:0.88:0.12:0.007 as a result of ICP elemental analysis, and the content of the element A was 0.3 mol %. D50 of CAM-12 was 14.0 μm, and the BET specific surface area was 0.26 $m^2$/g.

Comparative Example 4

The powder P1-1 and pure water at 25° C. were mixed at a weight ratio of 1:1 and, for water washing treatment, the slurry of the mixture was stirred for 20 minutes, and the slurry was filtered. The wet powder obtained by filtration was dried at 120° C. After drying, it was classified by passing it through a sieve (300 mesh) with a mesh opening of 45 μm, and the powder that passed through the sieve was referred to as CAM-13. The molar ratio of each element contained in CAM-13 satisfied Li:Ni:(Co+Al):S=0.96:0.88: 0.12:0.00 as a result of ICP elemental analysis. D50 of CAM-13 was 13.8 μm, and the BET specific surface area was 0.44 $m^2$/g.

Comparative Example 5

The powder P2-10 of magnesium oxide (MgO) was used instead of the powder P2-1. The powder P1-1 and the powder P2-10 were mixed so that the amount of Mg in the powder P2-10 and the amount of Ni, Co, and Al in the powder P1-1 satisfied Mg/(Ni+Co+Al)=2.2 mol %. CAM-14 was obtained in the same manner as in Example 1 except for these.

The BET specific surface area of the powder P2-10 was 29 $m^2$/g, the formula weight of magnesium oxide was 40.3 g/mol, the number of element A was 1, and the molar specific surface area S2 of the powder P2-10 was 1.17 $m^2$/mmol.

The molar ratio of each element contained in CAM-14 satisfied Li:Ni:(Co+Al+Mg):S=0.98:0.86:0.14:0.004 as a result of ICP elemental analysis, and the content of the element A was 1.9 mol %. D50 of CAM-14 was 13.9 μm, and the BET specific surface area was 0.51 $m^2$/g.

Comparative Example 6

The powder P2-11 of lithium sulfate monohydrate $(Li_2SO_4 \cdot H_2O)$ was used instead of the powder P2-1. CAM-15 was obtained in the same manner as in Example 1 except that the powder P1-1 and the powder P2-11 were mixed so that the amount of Li in the powder P2-11 and the amount of Ni, Co, and Al in the powder P1-1 satisfied Li (derived from P2-11)/(Ni+Co+Al)=2.0 mol %.

The BET specific surface area of the powder P2-11 was 0.25 $m^2$/g, the formula weight of lithium sulfate was 128 g/mol, the number of metal elements (Li) was 2, and the molar specific surface area S2 of the powder P2-11 was 0.016 $m^2$/mmol. In Comparative Example 6, Li derived from the powder P2-11 corresponds to the element A.

The molar ratio of each element contained in CAM-15 satisfied Li:Ni:(Co+Al):S=1.01:0.88:0.12:0.009 as a result of ICP elemental analysis, and the content of the element A was 1.0 mol %. D50 of CAM-15 was 14.1 μm, and the BET specific surface area was 0.35 $m^2$/g.

Comparative Example 7

The powder P2-12 of magnesium hydrogen phosphate trihydrate $(MgHPO_4 \cdot 3H_2O)$ was used instead of the powder P2-1. The powder P1-1 and the powder P2-12 were mixed so that the amount of Mg in the powder P2-12 and the amount of Ni, Co, and Al in the powder P1-1 satisfied Mg/(Ni+Co+Al)=1.6 mol %. The powder after mixing was obtained as CAM-16.

The BET specific surface area of the powder P2-12 was 0.08 $m^2$/g, the formula weight of magnesium hydrogen phosphate trihydrate was 174.3 g/mol, the number of element A was 1, and the molar specific surface area S2 of the powder P2-12 was 0.014 $m^2$/mmol.

The molar ratio of each element contained in CAM-16 satisfied Li:Ni:(Co+Al+Mg):(S+P)=0.98:0.87:0.13:0.02 as a result of ICP elemental analysis, and the content of the element A was 1.6 mol %. D50 of CAM-16 was 14.2 μm, and the BET specific surface area was 0.39 $m^2$/g.

Example 10

(Preparation of Powder P1-3)

A metal composite hydroxide 2 represented by a compositional formula $Ni_{0.83}Co_{0.12}Mn_{0.05}(OH)_2$ was obtained by the continuous method disclosed in JP2002-201028A. The metal composite hydroxide 2 contained sulfate radicals of 0.6 wt %. The metal composite hydroxide 2 and lithium hydroxide monohydrate were mixed so that the molar ratio Li/(Ni+Co+Mn) of the amount of Li to the total amount 1 of Ni, Co, and Mn contained in the metal composite hydroxide 2 was 1.02, to obtain a mixture 2.

Then, the mixture 2 obtained was filled into a sagger, and it was calcined in a calcination furnace at a highest holding temperature of 650° C. in an atmosphere of pure oxygen for 5 hours, to obtain a calcined product 3. The calcined product 3 was crushed using a stone mill-type crusher. Furthermore, the powder after crushing was filled into the sagger, and it was calcined in a calcination furnace at a highest holding temperature of 820° C. for 5 hours in an atmosphere of pure oxygen, to obtain a calcined product 4. The calcined product 4 was crushed using a stone mill-type crusher, to obtain a powder P1-3 of LiMO-2. D90 (D90 (P1)) of LiMO-2 was 17.9 μm.

The BET specific surface area of LiMO-2 was 0.33 $m^2$/g, the formula weight of LiMO-2 was 97.5 g/mol, and the molar specific surface area S1 of LiMO-2 was 0.032 $m^2$/mmol. The powder LiMO-2 had a layered structure and satisfied m=0.007, n=0.18, and X=Co, Mn, and S in the formula (I).

(Mixing Step and Classification Step)

The powder P1-3 of LiMO-2 and the powder P2-3 of aluminum sulfate pentadecahydrate $(Al_2(SO_4)_3 \cdot 15H_2O)$ used in Example 3 were mixed on a mortar for 5 minutes so that the amount of Al in the powder P2-3 and the amount of Ni, Co, and Mn in the powder P1-3 satisfied Al/(Ni+Co+Mn)=0.6 mol %, to obtain a mixture 3-2 as CAM-17.

The molar ratio of each element contained in CAM-17 satisfied Li:Ni:(Co+Mn+Al):S=1.01:0.83:0.17:0.014 as a result of ICP elemental analysis, and the content of the element A was 0.6 mol %. D50 of CAM-17 was 12.7 μm, and the BET specific surface area was 0.44 $m^2$/g.

Comparative Example 8

The powder P1-3 of LiMO-2 obtained by the process of Example 10 was referred to as CAM-18.

Evaluation Results

Tables 1 and 2 below show the evaluation results. In Tables 1 and 2, the ratio of the amount of the element A contained in the additive compound of the powder P2 to the total amount of metal elements other than Li contained in the lithium metal composite oxide of the powder P1 in the mixture is denoted as "amount of element A added".

TABLE 1

| | | Example 1 | Example 2 | Example 3 | Example 4 | Example 5 | Example 6 |
|---|---|---|---|---|---|---|---|
| P1 | Composition of LiMO | Ni/Co/Al = 88/9/3 | Ni/Co/Al = 88/9/3 | Ni/Co/Al = 88/9/3 | Ni/Co/Al = 88/9/3 | Ni/Co/Al = 88/9/3 | Ni/Co/Al = 88/9/3 |
| P2 | Additive compound | $MgSO_4$ anhydride | $Zr(SO_4)_2$ anhydride | $Al_2(SO_4)_3 \bullet 15H_2O$ | $Al_2(SO_4)_3 \bullet 15H_2O$ | $MgHPO_4 \bullet 3H_2O$ | $Mg(SO_4)$, $Al_2(SO_4)_3 \bullet 15H_2O$ (Molar ratio Mg:Al = 0.57:0.43) |
| | Molar specific surface area S2 [$m^2$/mmol] | 0.66 | 0.62 | 0.25 | 0.25 | 0.092 | 0.48 |
| | pH of liquid mixture | 6.5 | 1.3 | 3.1 | 3.1 | 7.9 | 3.4 |
| Amount of element A added [mol %] | | 2.0 | 0.8 | 0.8 | 0.8 | 1.7 | 2.1 |
| Ratio S2/S1 | | 23 | 22 | 8.7 | 8.7 | 3.2 | 17 |
| Classification step | | Yes | Yes | Yes | Yes | Yes | Yes |
| CAM | Content of element A [mol %] | 1.8 | 0.7 | 0.5 | 0.7 | 1.6 | 1.9 |
| | D50 [μm] | 13.7 | 13.5 | 14.0 | 14.2 | 14.3 | 13.7 |
| | BET specific surface area [$m^2$/g] | 0.46 | 0.29 | 0.33 | 0.30 | 0.37 | 0.38 |
| Cycle retention rate [%] | | 89.5 | 89.9 | 89.8 | 89.7 | 89.7 | 90.1 |
| Discharge rate capacity ratio (5 C/0.2 C) [%] | | 36.0 | 30.1 | 29.1 | 34.1 | 31.1 | 29.1 |
| Amount of lithium eluted [wt %] | | 0.07 | 0.04 | 0.08 | 0.04 | 0.11 | 0.02 |

| | | Example 7 | Example 8 | Example 9 | Example 10 |
|---|---|---|---|---|---|
| P1 | Composition of LiMO | Ni/Co/Al = 88/9/3 | Ni/Co/Al = 88/9/3 | Ni/Co/Al = 88/9/3 | Ni/Co/Mn = 83/12/5 |
| P2 | Additive compound | $CaSO_4 \bullet 2H_2O$ | $MgSO_4$, $CaSO_4 \bullet 2H_2O$ (Molar ratio Mg:Ca = 0.67:0.33) | $La_2(SO_4)_3$ anhydride | $Al_2(SO_4)_3 \bullet 15H_2O$ |
| | Molar specific surface area S2 [$m^2$/mmol] | 0.19 | 0.51 | 0.83 | 0.25 |
| | pH of liquid mixture | 6.3 | 6.4 | 5.7 | 3.1 |
| Amount of element A added [mol %] | | 2.0 | 1.8 | 0.8 | 0.6 |
| Ratio S2/S1 | | 6.5 | 18 | 29 | 7.8 |
| Classification step | | Yes | Yes | No | No |
| CAM | Content of element A [mol %] | 1.9 | 1.7 | 0.8 | 0.6 |
| | D50 [μm] | 13.7 | 13.7 | 13.6 | 12. |
| | BET specific surface area [$m^2$/g] | 0.48 | 0.48 | 0.28 | 0.44 |
| Cycle retention rate [%] | | 89.7 | 90.1 | 89.2 | 92.9 |
| Discharge rate capacity ratio (5 C/0.2 C) [%] | | 29.7 | 31.5 | 33.0 | 33.8 |
| Amount of lithium eluted [wt %] | | 0.10 | 0.0 | 0.12 | 0.07 |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| P1 | Composition of LiMO | Ni/Co/Al = 88/9/3 | Ni/Co/Al = 88/9/3 | Ni/Co/Al = 88/9/3 | Ni/Co/Al = 88/9/3 | Ni/Co/Al = 88/9/3 | Ni/Co/Al = 88/9/3 | Ni/Co/Al = 88/9/3 | Ni/Co/Mn = 83/12/5 |
| P2 | Additive compound | — | $MgSO_4 \cdot 7H_2O$ | $MgSO_4 \cdot 7H_2O$ | — | MgO | $Li_2SO_4 \cdot H_2O$ | $MgHPO_4 \cdot 3H_2O$ | — |
|  | Molar specific surface area S2 [$m^2$/mmol] | — | 0.035 | 0.035 | — | 1.17 | 0.016 | 0.014 | — |
|  | pH of liquid mixture | — | 6.0 | 6.0 | — | 10.8 | 5.7 | 8.0 | — |
| Amount of element A added [mol %] |  | — | 2.4 | 1.6 | — | 2.2 | 2.0 | 1.6 | — |
| Ratio S2/S1 |  | — | 1.2 | 1.2 | — | 40 | 0.55 | 0.48 | — |
| Classification step |  | Yes | No | Yes | Yes | Yes | Yes | No | No |
| CAM | Content of element A [mol %] | — | 2.4 | 0.3 | — | 1.9 | 1.0 | 1.6 | — |
|  | D50 [μm] | 14.0 | 13.9 | 14.0 | 13.8 | 13.9 | 14.1 | 14.2 | 13.4 |
|  | BET specific surface area [$m^2$/g] | 0.31 | 0.31 | 0.26 | 0.44 | 0.51 | 0.35 | 0.39 | 0.33 |
| Cycle retention rate [%] |  | 87.4 | 88.2 | 88.4 | 77.9 | 89.6 | 88.8 | 89.0 | 91.2 |
| Discharge rate capacity ratio (5 C/0.2 C) [%] |  | 33.4 | 35.4 | 35.8 | 30.1 | 25.3 | 34.9 | 27.6 | 31.6 |
| Amount of lithium eluted [wt %] |  | 0.25 | 0.06 | 0.20 | 0.08 | 0.18 | 0.23 | 0.20 | 0.16 |

35

As shown in Table 1, Examples 1 to 10 in which the powder P2 containing a specific salt and having a molar specific surface area S2 of 0.05 $m^2$/mmol or more was used each had a reduced amount of the lithium compound to be eluted and an excellent cycle characteristic and an excellent discharge rate characteristic.

Meanwhile, as shown in Table 2, Comparative Example 1 in which the powder P2 was not used had a large amount of the lithium compound to be eluted and a poor cycle characteristic. Comparative Examples 2 and 3 in which the powder P2 of sulfate having a molar specific surface area S2 of less than 0.05 $m^2$/mmol was used had a poor cycle characteristic. In addition, when the classification step was carried out using the powder P2 with a molar specific surface area S2 of less than 0.05 $m^2$/mmol, as in Comparative Example 3, the amount of the lithium compound to be eluted increased. Comparative Example 4 in which LiMO was washed with water without using the powder P2 had a reduced amount of the lithium compound to be eluted but had a poor cycle characteristic. Comparative Example 5 used an oxide, which is not the specific salt as the additive compound, had a large amount of the lithium compound to be eluted and a poor discharge rate characteristic. Comparative Example 6 in which the powder P2 free from the specific metal elements with a molar specific surface area S2 of less than 0.05 $m^2$/mmol was used had a large amount of the lithium compound to be eluted and a poor cycle characteristic. Comparative Example 7 in which the powder P2 of a phosphate having a molar specific surface area S2 of less than 0.05 $m^2$/mmol was used had a large amount of the lithium compound to be eluted, a poor cycle characteristic, and a poor discharge rate characteristic. Comparative Example 8 in which the powder P2 was not used had a large amount of the lithium compound to be eluted.

INDUSTRIAL APPLICABILITY

An aspect of the present invention can be used for producing a positive electrode active material for a lithium secondary battery.

REFERENCE SIGNS LIST

1: Separator
2: Positive electrode
3: Negative electrode
4: Electrode group
5: Battery can
6: Electrolytic solution
7: Top insulator
8: Sealing body
10: Lithium secondary battery
21: Positive electrode lead
31: Negative electrode lead
100: Laminate
110: Positive electrode
111: Positive electrode active material layer
112: Positive electrode current collector
113: External terminal
120: Negative electrode
121: Negative electrode active material layer
122: Negative electrode current collector

123: External terminal
130: Solid electrolyte layer
200: Exterior body
200*a*: Opening Portion
1000: All-solid-state lithium secondary battery

The invention claimed is:

1. A method for producing a positive electrode active material for a lithium secondary battery, the method comprising a mixing step of mixing a powder P1 containing a lithium metal composite oxide and a powder P2 containing an additive compound to obtain a mixture, wherein the lithium metal composite oxide has a layered structure and contains Ni, the additive compound is a salt of a cation of at least one element A selected from the group consisting of Al, Mg, Ca, Sr, Zr, Ti, Co, La, and Ce and any one anion selected from the group consisting of $SO_4^{2-}$, $PO_4^{3-}$, $HPO_4^{2-}$, and $H_2PO_4^{-}$, and the powder P2 has a molar specific surface area S2, calculated by a formula (2) below, of 0.05 m$^2$/mmol or more, $$S2 = BET2 \times F2/(1000 \times N2) \quad (2)$$

(in the formula (2), BET2 represents a BET specific surface area [m$^2$/g] of the powder P2, F2 represents a formula weight [g/mol] of a compositional formula of the additive compound, and N2 represents the number of element A in the compositional formula of the additive compound).

2. The method for producing the positive electrode active material for the lithium secondary battery according to claim 1, wherein a compositional formula of the lithium metal composite oxide is represented by a formula (I) below, $$Li[Li_m(Ni_{(1-n)}X_n)_{1-m}]O_2 \quad (I)$$

(in the formula (I), X represents one or more elements selected from the group consisting of Co, Mn, Fe, Cu, Ti, Mg, Ca, Al, W, Mo, Nb, Zn, Sn, Zr, Ga, B, Si, S, and P, and $-0.1 \leq m \leq 0.2$ and $0 \leq n \leq 0.3$ are satisfied).

3. The method for producing the positive electrode active material for the lithium secondary battery according to claim 2, comprising a step of obtaining the lithium metal composite oxide by mixing and calcining a lithium compound and a metal composite compound containing Ni before the mixing step.

4. The method for producing the positive electrode active material for the lithium secondary battery according to claim 2, wherein a ratio S2/S1 of a molar specific surface area S1 [m$^2$/mmol] of the lithium metal composite oxide calculated by a formula (1) below to the molar specific surface area S2 [m$^2$/mmol] of the powder P2 is 1.5 or more and 50 or less, $$S1 = BET1 \times F1/1000 \quad (1)$$

(in the formula (1), BET1 represents a BET specific surface area [m$^2$/g] of the lithium metal composite oxide, and F1 represents a formula weight [g/mol] of the compositional formula of the lithium metal composite oxide).

5. The method for producing the positive electrode active material for the lithium secondary battery according to claim 2, comprising a classification step of classifying the mixture with a sieve after the mixing step.

6. The method for producing the positive electrode active material for the lithium secondary battery according to claim 5, wherein D90 (P1)/OP, which is a ratio of a 90% cumulative volume particle diameter D90 (P1) [μm] of the lithium metal composite oxide to a mesh opening OP [μm] of the sieve, is 0.1 or more and 0.8 or less.

7. The method for producing the positive electrode active material for the lithium secondary battery according to claim 2, wherein a ratio of an amount of element A contained in the additive compound to a total amount of metal elements other than Li contained in the lithium metal composite oxide in the mixture is 0.2 mol % or more and 3.0 mol % or less.

8. The method for producing the positive electrode active material for the lithium secondary battery according to claim 2, wherein a liquid mixture to be obtained by mixing the powder P2 and water at a ratio of the additive compound:water=0.1 mol:1 L in the powder P2 has a pH of less than 8.3 at 25° C.

9. The method for producing the positive electrode active material for the lithium secondary battery according to claim 2, wherein the positive electrode active material for the lithium secondary battery has a 50% cumulative volume particle diameter D50 of 5 μm or more and 30 μm or less.

10. The method for producing the positive electrode active material for the lithium secondary battery according to claim 2, wherein the positive electrode active material for the lithium secondary battery has a BET specific surface area of 0.1 m$^2$/g or more and 3 m$^2$/g or less.

11. The method for producing the positive electrode active material for the lithium secondary battery according to claim 1, comprising a step of obtaining the lithium metal composite oxide by mixing and calcining a lithium compound and a metal composite compound containing Ni before the mixing step.

12. The method for producing the positive electrode active material for the lithium secondary battery according to claim 1, wherein a ratio S2/S1 of a molar specific surface area S1 [m$^2$/mmol] of the lithium metal composite oxide calculated by a formula (1) below to the molar specific surface area S2 [m$^2$/mmol] of the powder P2 is 1.5 or more and 50 or less, $$S1 = BET1 \times F1/1000 \quad (1)$$

(in the formula (1), BET1 represents a BET specific surface area [m$^2$/g] of the lithium metal composite oxide, and F1 represents a formula weight [g/mol] of the compositional formula of the lithium metal composite oxide).

13. The method for producing the positive electrode active material for the lithium secondary battery according to claim 1, comprising a classification step of classifying the mixture with a sieve after the mixing step.

14. The method for producing the positive electrode active material for the lithium secondary battery according to claim 5, wherein D90 (P1)/OP, which is a ratio of a 90% cumulative volume particle diameter D90 (P1) [μm] of the lithium metal composite oxide to a mesh opening OP [μm] of the sieve, is 0.1 or more and 0.8 or less.

15. The method for producing the positive electrode active material for the lithium secondary battery according to claim 1, wherein a ratio of an amount of element A contained in the additive compound to a total amount of metal elements other than Li contained in the lithium metal composite oxide in the mixture is 0.2 mol % or more and 3.0 mol % or less.

16. The method for producing the positive electrode active material for the lithium secondary battery according to claim 1, wherein a liquid mixture to be obtained by mixing the powder P2 and water at a ratio of the additive compound:water=0.1 mol:1 L in the powder P2 has a pH of less than 8.3 at 25° C.

17. The method for producing the positive electrode active material for the lithium secondary battery according to claim 1, wherein the positive electrode active material for the lithium secondary battery has a 50% cumulative volume particle diameter D50 of 5 μm or more and 30 μm or less.

18. The method for producing the positive electrode active material for the lithium secondary battery according to claim 1, wherein the positive electrode active material for the lithium secondary battery has a BET specific surface area of 0.1 m²/g or more and 3 m²/g or less.

19. A method for producing a positive electrode for a lithium secondary battery, comprising:

a step of obtaining the positive electrode active material for the lithium secondary battery by the method for producing the positive electrode active material for the lithium secondary battery according to claim 1; and a step of supporting a positive electrode mixture containing the positive electrode active material for the lithium secondary battery on a positive electrode current collector.

\* \* \* \* \*